(12) United States Patent
Shimizu et al.

(10) Patent No.: US 10,133,451 B2
(45) Date of Patent: Nov. 20, 2018

(54) OPERATION DISPLAY DEVICE

(71) Applicant: KONICA MINOLTA, INC., Chiyoda-ku, Tokyo (JP)

(72) Inventors: Hideaki Shimizu, Hino (JP); Yasuaki Sugimoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 363 days.

(21) Appl. No.: 14/983,163

(22) Filed: Dec. 29, 2015

(65) Prior Publication Data
US 2016/0196050 A1 Jul. 7, 2016

(30) Foreign Application Priority Data
Jan. 7, 2015 (JP) ................................ 2015-001872

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0481* (2013.01); *H04N 1/00384* (2013.01);
(Continued)

(58) Field of Classification Search
CPC ............... G06F 3/04883; G06F 3/04888; G06F 3/04845; G06F 3/0481; G06F 3/0482;
(Continued)

(56) References Cited

U.S. PATENT DOCUMENTS

| 5,305,435 A * | 4/1994 | Bronson | ............... G06F 3/0481 715/775 |
| 2011/0025718 A1* | 2/2011 | Takarabe | ............ G06F 3/04886 345/661 |

(Continued)

FOREIGN PATENT DOCUMENTS

| JP | 0815625 A | 7/1996 |
| JP | 2011034169 A | 2/2011 |

(Continued)

OTHER PUBLICATIONS

Japanese Office Action (and English translation thereof) dated Feb. 8, 2017 issued in counterpart Japanese Application No. 2015-001872.

(Continued)

*Primary Examiner* — Tuyetlien T Tran
(74) *Attorney, Agent, or Firm* — Holtz, Holtz & Volek PC

(57) ABSTRACT

Disclosed is an operation display device, including: a display unit; a display control unit configured to display operation buttons; and an operation unit configured to receive an operation to one of the operation buttons, wherein in case that identification information is arranged in the operation button in a first display mode, when the operation button is displayed so as to display whole of the identification information in the display area, the display control unit displays the identification information in the first display mode, and in case that the identification information is arranged in the operation button in the first display mode, when a part of the identification information protrudes from the display area, the display control unit changes a display mode of the identification information to a display mode which is different from the first display mode, and displays the identification information in the operation button.

4 Claims, 21 Drawing Sheets

(51) Int. Cl.
    *H04N 1/00*     (2006.01)
    *G06F 3/0488*     (2013.01)
    *G06F 3/0484*     (2013.01)

(52) U.S. Cl.
    CPC ..... *H04N 1/00427* (2013.01); *H04N 1/00474* (2013.01); *H04N 1/00506* (2013.01); *G06F 3/0488* (2013.01); *G06F 3/04845* (2013.01); *G06F 3/04883* (2013.01); *G06F 2203/04806* (2013.01); *H04N 2201/0094* (2013.01)

(58) Field of Classification Search
    CPC ...... G06F 3/04842; G06F 2203/04806; G09G 5/14; H04N 1/00506; H04N 1/00384; H04N 1/00474; H04N 1/00427; H04N 2201/0094
    See application file for complete search history.

(56) References Cited

U.S. PATENT DOCUMENTS

2013/0080880 A1*   3/2013  Cassistat .......... G06F 17/30994 715/244
2013/0212522 A1*   8/2013  Fleizach ............... G06F 3/0488 715/784
2013/0297206 A1*  11/2013  Heng ................. G01C 21/3682 701/532
2013/0332871 A1*  12/2013  Bucur .................... G06T 19/00 715/768

FOREIGN PATENT DOCUMENTS

| JP | 2012226614 A | | 11/2012 | |
| --- | --- | --- | --- | --- |
| JP | 2013-88506 | * | 5/2013 | ............ G06F 3/048 |
| JP | 2013088506 A | | 5/2013 | |

OTHER PUBLICATIONS

Japanese Office Action (and English translation thereof) dated May 10, 2017 issued in counterpart Japanese Application No. 2015-001872.

Chinese Office Action dated Dec. 21, 2017 issued in counterpart Chinese Application No. 20161000493.7.

* cited by examiner

FIG.9
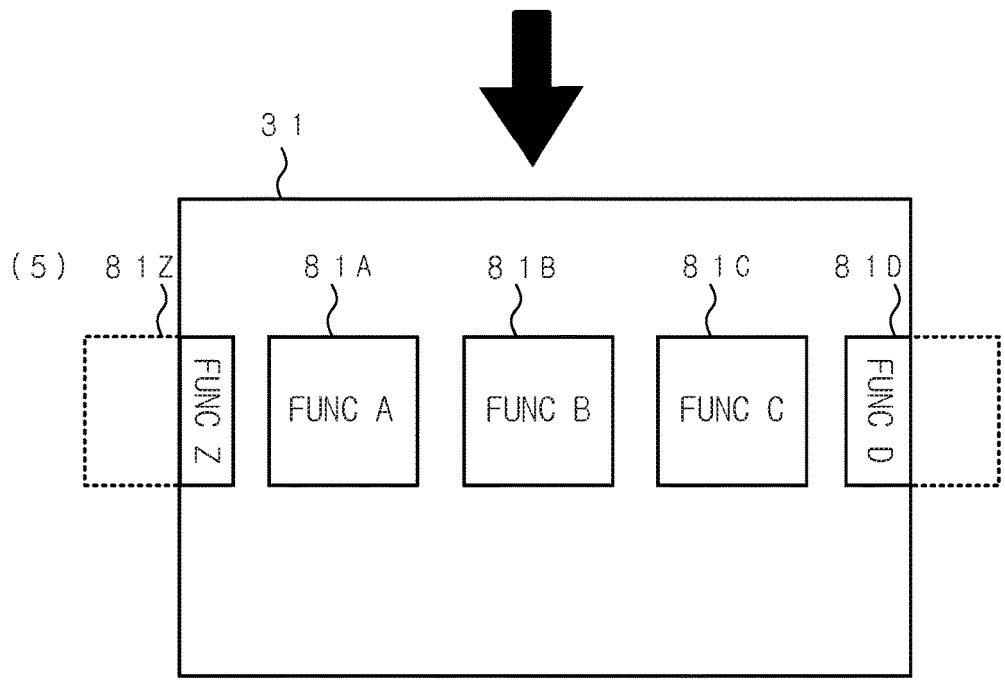
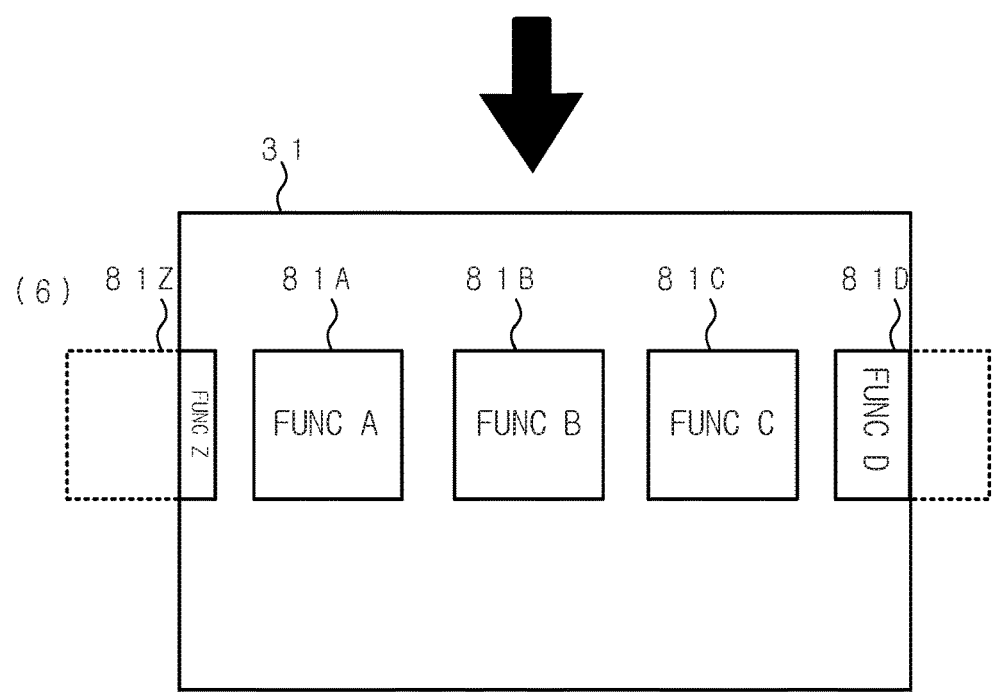

FIG.10
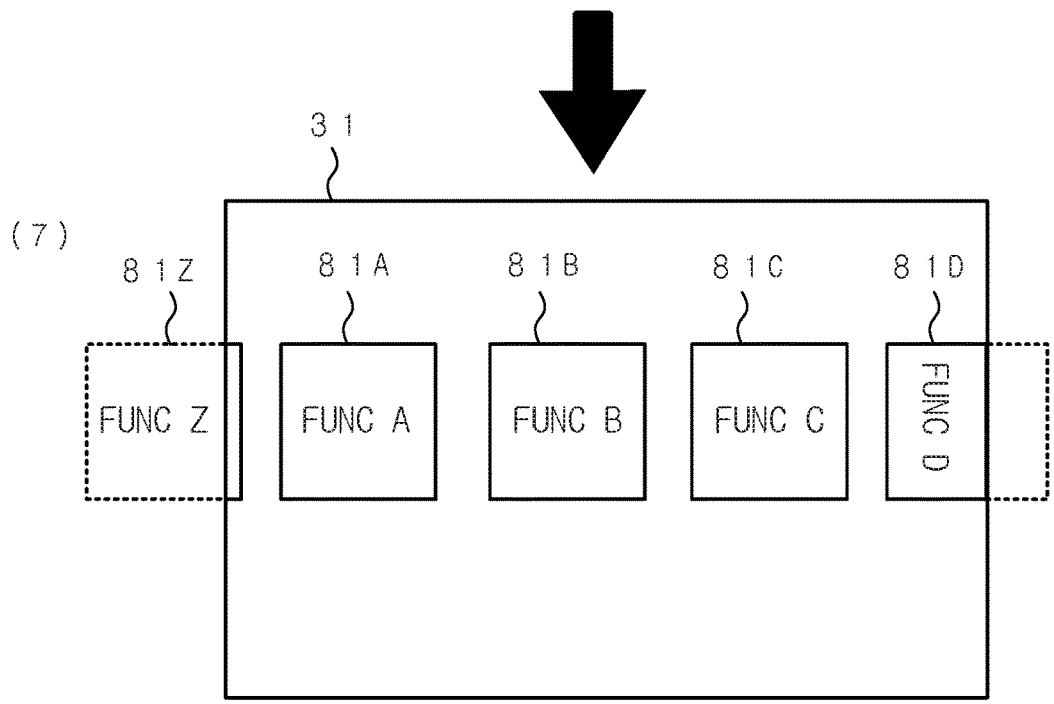
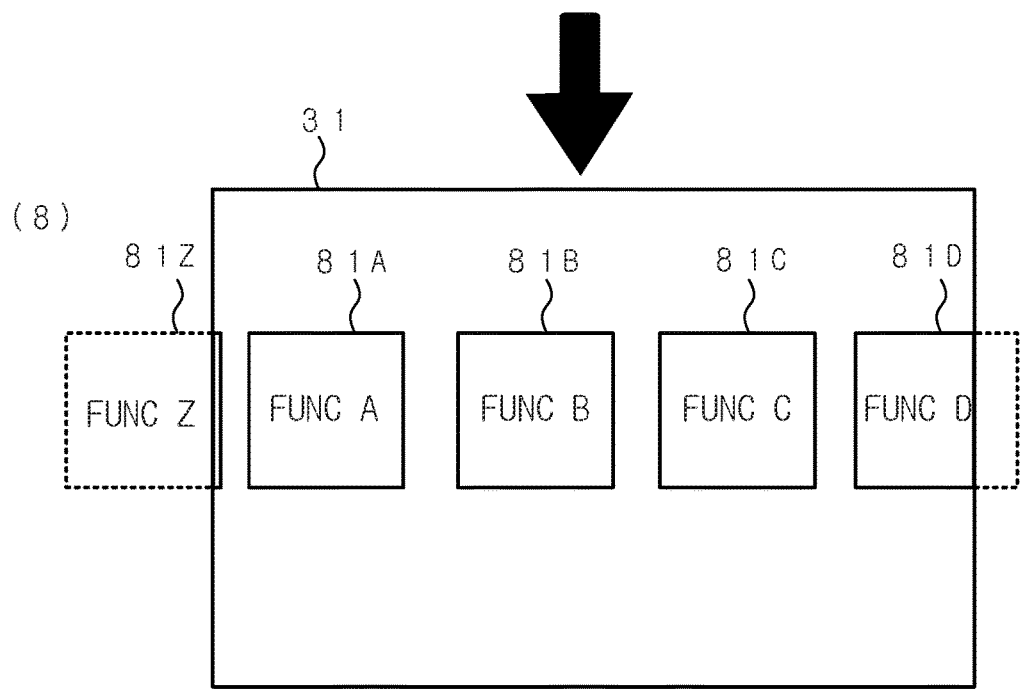

| JOB TYPE | GROUP |
|---|---|
| FTP | 1-SIDED/2-SIDED, RESOLUTION, FILE FORMAT, DOCUMENT NAME |
| E-mail | 1-SIDED/2-SIDED, RESOLUTION, FILE FORMAT, DOCUMENT NAME |
| FAX | 1-SIDED/2-SIDED, RESOLUTION, LINE SETTING, POLLING TRANSMISSION |

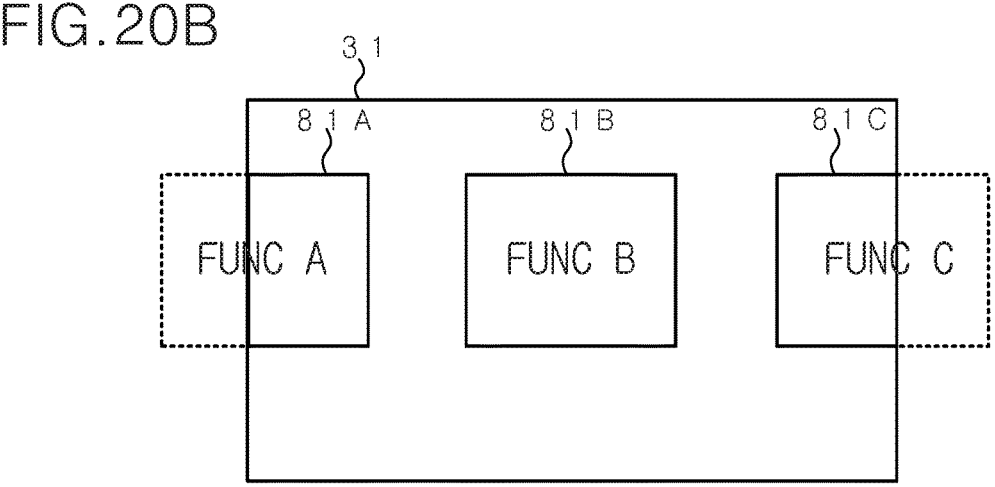
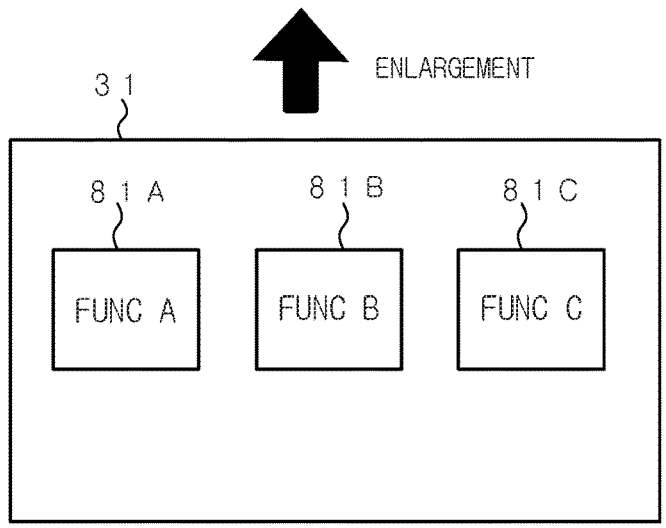
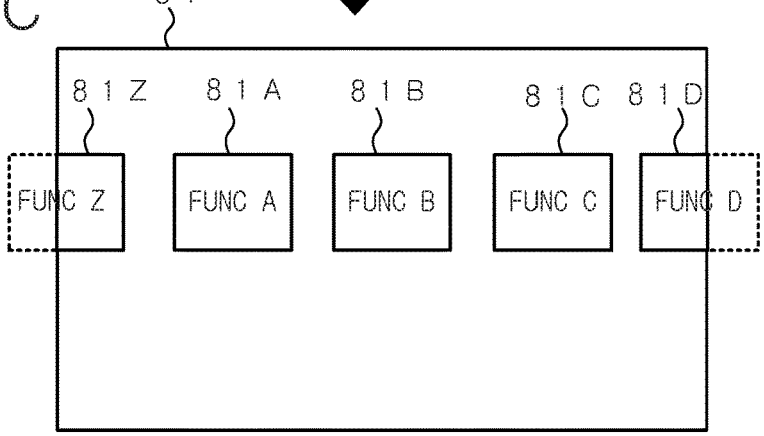

OPERATION DISPLAY DEVICE

BACKGROUND OF THE INVENTION

Field of the Invention

The present invention relates to an operation display device for displaying some of a plurality of operation buttons.

Description of Related Art

Conventionally, in an image forming apparatus, such as a printing machine, a multi function peripheral having a printing function, a scanning function, a copying function and a facsimile function, and the like, an operation panel or the like provided in a main body of the image forming apparatus is used to perform a setting operation, such as print settings or the like. In the setting operation, not only hardware keys arranged on the operation panel but also operation buttons which are software keys displayed on a display unit of the operation panel, are used.

In recent years, the multi function peripheral has multi-functioned more and has many operation buttons for performing the setting operations. However, because the size of the operation panel (display unit) is limited, it is difficult to display all of the operation buttons on the display unit in the size in which the contents of each operation button can be viewed by a user at the same time. Therefore, in general, the multi function peripheral displays some of a plurality of operation buttons and moves the positions of some of the operation buttons. As a result, the multi function peripheral displays each of the operation buttons and receives the setting operation to the displayed operation buttons. As a method for moving the positions of some of the operation buttons, for example, a so-called scroll display in which all of the operation buttons and the like which cannot be displayed in a display screen at the same time are displayed by sliding them in the up and down direction or in the right and left direction, has been proposed.

Further, when the above-described scroll display is performed, a part of the operation button may protrude from the screen. As a result, there are some cases in which the user cannot confirm the identification information (such as a caption, an icon or the like, hereinafter, referred to as button identification information) of the function assigned to the operation button and described in the frame of the operation button. For example, FIG. 21 shows an example in case that the operation buttons are displayed in the state in which each part of two of the operation buttons protrudes from the screen. In FIG. 21, four operation buttons (FUNC A, FUNC B, FUNC C and FUNC D are described in the frames as the button identification information) are displayed on the display unit 31. However, each part of the operation buttons which are FUNC A and FUNC D protrudes from the screen (in FIG. 21, each part of the operation buttons which protrudes from the screen is shown in gray) and the user cannot view the above part.

When a part of the button identification information protrudes from the screen, there are some cases in which the user cannot recognize the contents of the button identification information. In FIG. 21, for example, in the operation button in which FUNC D is displayed, the character part (the character "D" shown in the drawing) of the button identification information, for identifying FUNC D from the other functions protrudes from the screen. In this state, the user cannot recognize the function assigned to the operation button in which a part of the button identification information protrudes from the screen.

Normally, in the scroll display, in case that there is an operation button in which a part of the button identification information protrudes from the screen, in order to confirm the button identification information described in the frame of the operation button, it is necessary that the user performs the scroll operation again and returns the display position to the position in which the button identification information can be viewed.

In Japanese Patent Application Publication No. 2013-88506, the following technology is disclosed. By linking operation panel with the display contents of a mobile terminal arranged adjacent to the operation panel, the contents continued to the window displayed by the operation panel are displayed on the mobile terminal (the display area is enlarged). In this technology, because a part of the operation button, which protrudes from the display area of the operation panel is displayed on the mobile terminal, the user can view the whole operation button across the operation panel and the mobile terminal (see Japanese Patent Application Publication No. 2013-88506).

In the method disclosed in Japanese Patent Application Publication No. 2013-88506, it is necessary that the mobile terminal is prepared in order to display a part of the button identification information, which protrudes from the display area of the operation panel, and that the operation for linking the mobile terminal with the display contents is performed. Therefore, the troublesome task is given to the user.

SUMMARY

To achieve at least one of the abovementioned objects, an operation display device reflecting one aspect of the present invention, comprises:

a display unit;

a display control unit configured to display operation buttons in a display area of the display unit; and an operation unit configured to receive an operation to one of the operation buttons displayed in the display area, wherein in case that identification information indicating a function assigned to each operation button is arranged in the operation button in a first display mode, when the operation button is displayed in a position in which whole of the identification information is displayed in the display area, the display control unit displays the identification information in the operation button in the first display mode, and in case that the identification information is arranged in the operation button in the first display mode, when the operation button is displayed in a position in which a part of the identification information protrudes from the display area, the display control unit changes a display mode of the identification information to a display mode which is different from the first display mode, and displays the identification information in the operation button.

Preferably, the display mode which is different from the first display mode is a display mode in which whole of the identification information is displayed in the display area.

Preferably, the display mode of the identification information is changed to the display mode which is different from the first display mode, by executing at least one of a reduction of the identification information, a change in an array of the identification information, a change in an arrangement position of the identification information, and an omission indication of the identification information.

Preferably, a plurality of the operation buttons are grouped, and in case that one operation button belonging to one group is displayed in the position in which the part of the identification information protrudes from the display area and in case that any other operation buttons belonging to the one group to which the one operation button belongs are not displayed in the display area, the display control unit displays the identification information of the one operation button in the first display mode, and in case that the one operation button belonging to the one group is displayed in the position in which the part of the identification information protrudes from the display area and in case that at least one of the other operation buttons belonging to the one group to which the one operation button belongs is displayed in the display area, the display control unit changes the display nmode of the identification information of the one operation button to the display mode which is different from the first display mode, and displays the identification information of the one operation button.

Preferably, in case that the operation button related to a set setting item is displayed in the position in which the part of the identification information protrudes from the display area, the display control unit changes the display mode of the identification information of the operation button related to the set setting item to the display mode which is different from the first display mode, and displays the identification information of the operation button related to the set setting item, and in case that the operation button which is not related to the set setting item is displayed in the position in which the part of the identification information protrudes from the display area, the display control unit displays the identification information of the operation button which is not related to the set setting item, in the first display mode.

Preferably, the display control unit changes the display mode of the identification information of the operation button while a display position of the operation button is moved.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 8 to 10 show an example of the display contents which are displayed during the scrolling;

FIG. 16 shows the job function table;

FIGS. 20A, 20B and 20C show examples of the display contents which are displayed in case that the display contents are enlarged or reduced.

DETAILED DESCRIPTION OF PREFERRED EMBODIMENTS

Hereinafter, preferred embodiments of the present invention will be explained with reference to the accompanying drawings.

Figure 1:
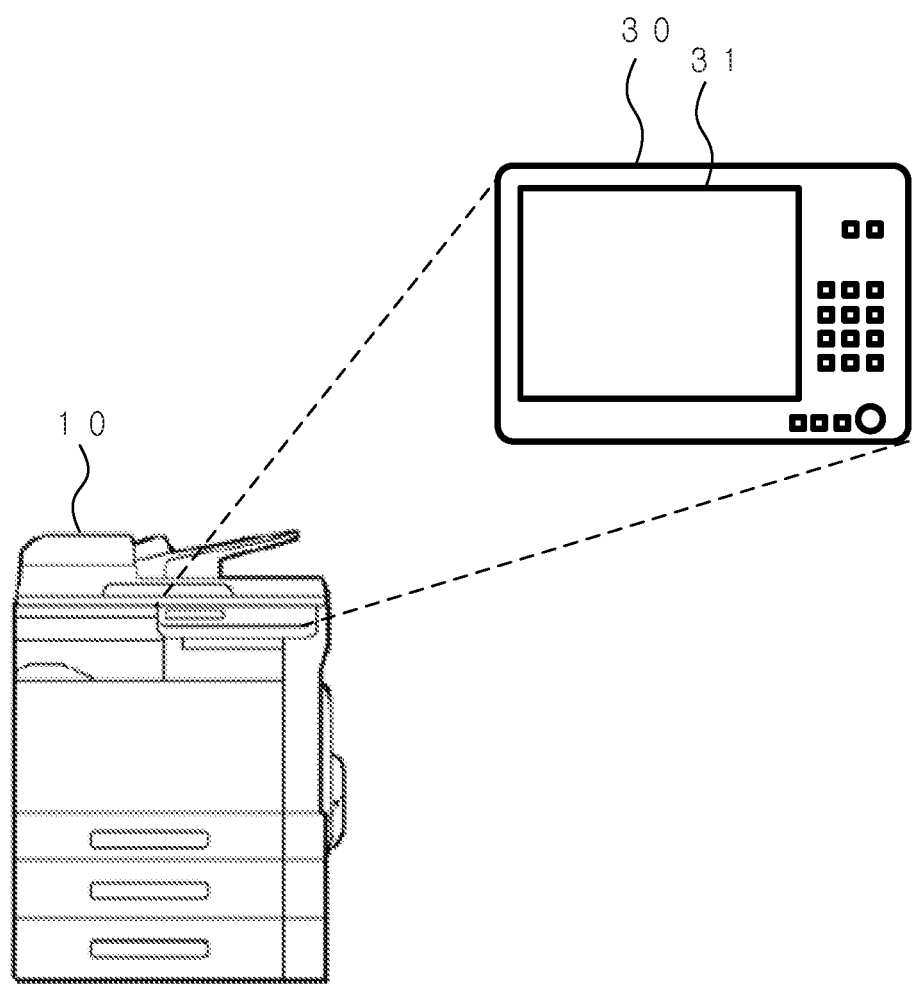
FIG. 1 is an explanatory view showing the image forming apparatus and the operation panel thereof according to the embodiments.

First Embodiment:

FIG. 1 shows the image forming apparatus 10 having the function of the operation display device according to the embodiment.

The image forming apparatus 10 is a so-called multi function peripheral having the function of executing a job, such as a copy job for printing an image on the recording paper by optically reading the image of an original, a scan job for storing image data of the read original as a file or transmitting the image data to an external device, and a print job for printing out an image on recording paper in accordance with the data transmitted from an external device. The image forming apparatus 10 comprises an operation panel 30 including a display unit 31 and an operation unit 32, and receives a setting operation for inputting each type of setting or job from a user via the operation panel 30 (See FIG. 4).

When each type of setting operation is received from the user, the operation panel 30 displays the operation buttons for receiving the setting operation. However, there are a plurality of operation buttons for receiving the setting operation and it is difficult to display all of the operation buttons on the display unit 31 in the size in which the contents of each operation button can be viewed by the user at the same time. Therefore, the operation panel 30 displays some of a plurality of operation buttons and moves the positions of some of the operation buttons. As a result, the operation panel 30 displays each of the operation buttons and receives the setting operations to the displayed operation buttons. The identification information (a caption, an icon or the like, hereinafter, referred to as button identification information) indicating the contents of the function assigned to the operation button is described in the frame of each operation button. The user confirms the button identification information and performs the setting operation to the operation button to which an optional function is assigned.

Figure 2:
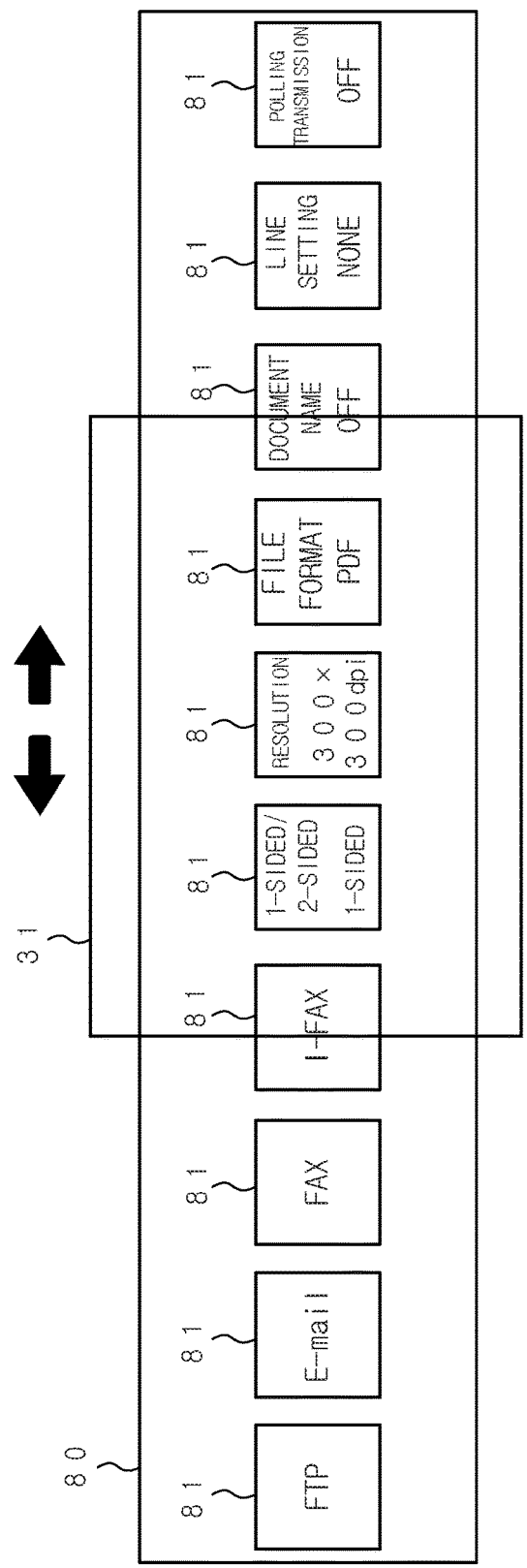
FIG. 2 is an explanatory view showing the situation in which the operation panel displays a part of a long band-like window.

In the embodiment, an arrangement order of a plurality of operation buttons is previously determined. As a method for moving the positions of some of the operation buttons as described above, the so-called scroll display in which all of the operation buttons which cannot be displayed in the display unit 31 at the same time are displayed by sliding them in the up and down direction or in the right and left direction, is adopted. For example, the operation panel 30 arranges a plurality of operation buttons 81 in the belt-like window 80 elongated in a lateral direction as shown in FIG. 2, and displays a part of the belt-like screen 80. By moving the positions of some of the operation buttons in the right and left direction, the operation panel 30 displays each of the operation buttons 81 on the display unit 31 and receives the setting operations to the displayed operation buttons 81.

Figure 21:
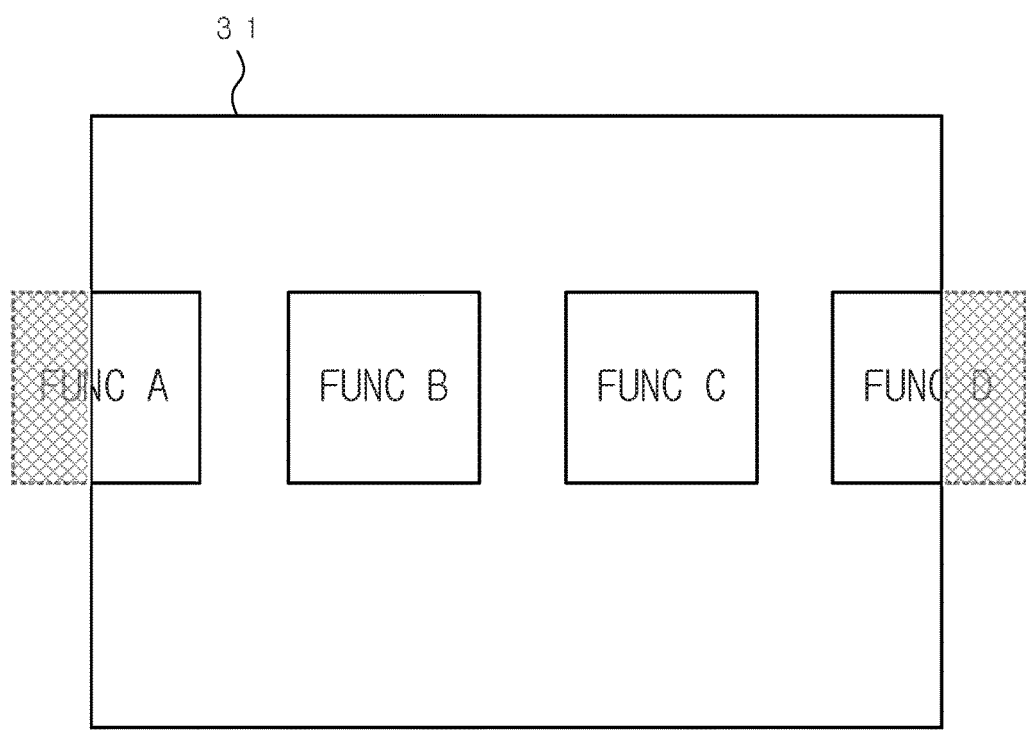
FIG. 21 shows an example in case that a part of the identification information indicating the functions assigned to the operation buttons protrudes from the screen.

When the scroll display is performed, there is some possibility that the operation buttons 81 protrude from the display area of the display unit 31 during the scroll display or at the time at which the scrolling is completed. Further, there is some possibility that the user cannot view the button identification information described in the frame of the operation button 81 (see FIGS. 2 and 21).

In the embodiment, in case that the button identification information indicating the function assigned to the operation button 81 is arranged in the operation button 81 in the first display mode (normal display mode), when the operation button 81 is displayed in the position in which the whole button identification information is displayed in the display area of the display unit 31, the image forming apparatus 10 displays the button identification information in the operation button in the first display mode. Further, in case that the button identification information is arranged in the operation button 81 in the first display mode, when the operation button 81 is displayed in the position in which a part of the button identification information protrudes from the display area of the display unit 31, the image forming apparatus 10 changes the display mode of the button identification information to a display mode (referred to as the changed display mode) which is different from the first display mode, and displays the button identification information in the operation button 81.

Figure 3:
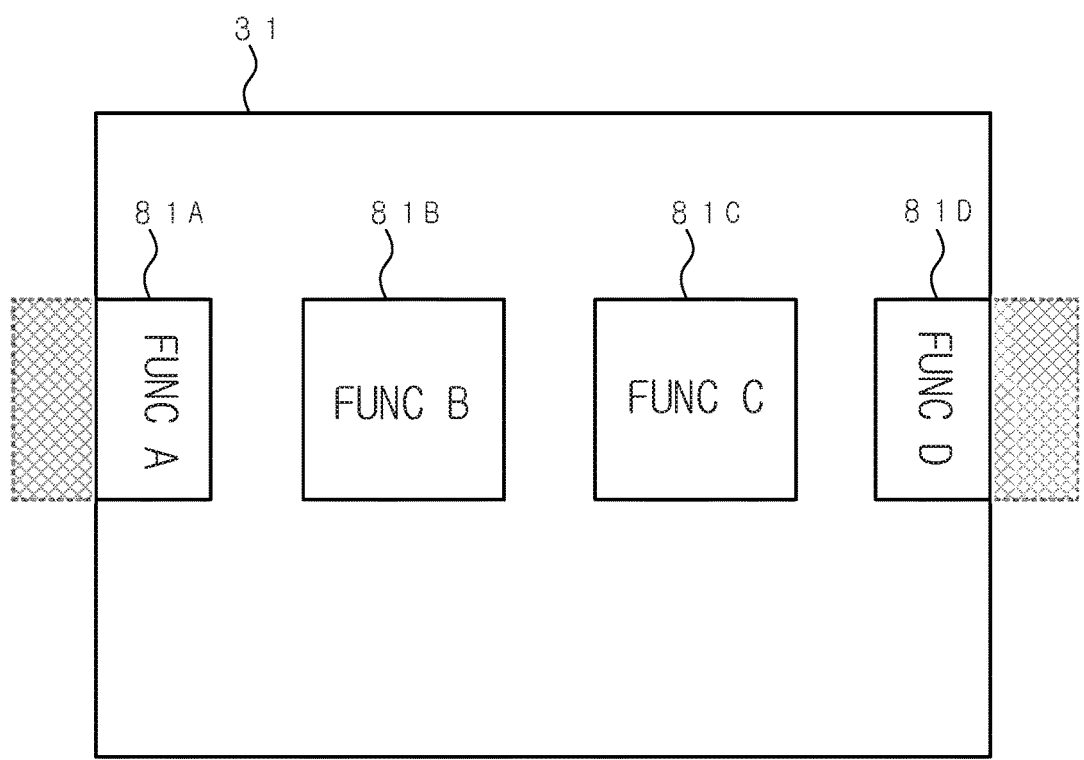
FIG. 3 shows an example of the window including operation buttons in which button identification information is displayed in the changed display mode.

For example, FIG. 3 shows an example of the window in case that the operation buttons 81 that display the button identification information in the first display mode and the operation buttons 81 that display the button identification information in the display mode (referred to as the changed display mode) which is different from the first display mode, are displayed. In FIG. 3, four operation buttons 81 (the button identification information of FUNC A, FUNC B, FUNC C and FUNC D is described in each operation button 81) are displayed on the display unit 31.

In the drawing, the operation button 81 in which the FUNC A is described is referred to as the operation button 81A, the operation button 81 in which the FUNC B is described is referred to as operation button 81B, the operation button 81 in which the FUNC C is described is referred to as the operation button 81C, and the operation button 81 in which the FUNC D is described is referred to as the operation button 81D.

In the operation buttons 81B and 81C, the whole of the operation buttons are displayed in the display area of the display unit 31, and the button identification information is displayed in the first display mode (the button identification information is centered and horizontally written). In the operation buttons 81A and 81D, a part of each operation button protrudes from the display area of the display unit 31. Further, in case that the button identification information of the operation buttons 81A and 81D is displayed in the first display mode like the operation buttons 81B and 81C, a part of the button identification information protrudes from the display area of the display unit 31.

Consequently, in FIG. 3, the button identification information of the operation button 81A and the button identification information of the operation button 81D is displayed in the display mode (changed display mode) which is different from the first display mode, specifically, in the display mode in which the whole button identification information is displayed in the display area of the display unit 31 (the button identification information is positioned in the operation buttons 81 and arranged in the range of the display area, and is vertically written, for example, is rotated by 90 degrees). As a result, like the operation buttons 81A and 81D, even if a part of each operation button protrudes from the display area of the display unit 31, the button identification information of the operation buttons 81 can be viewed as a whole.

Figure 4:
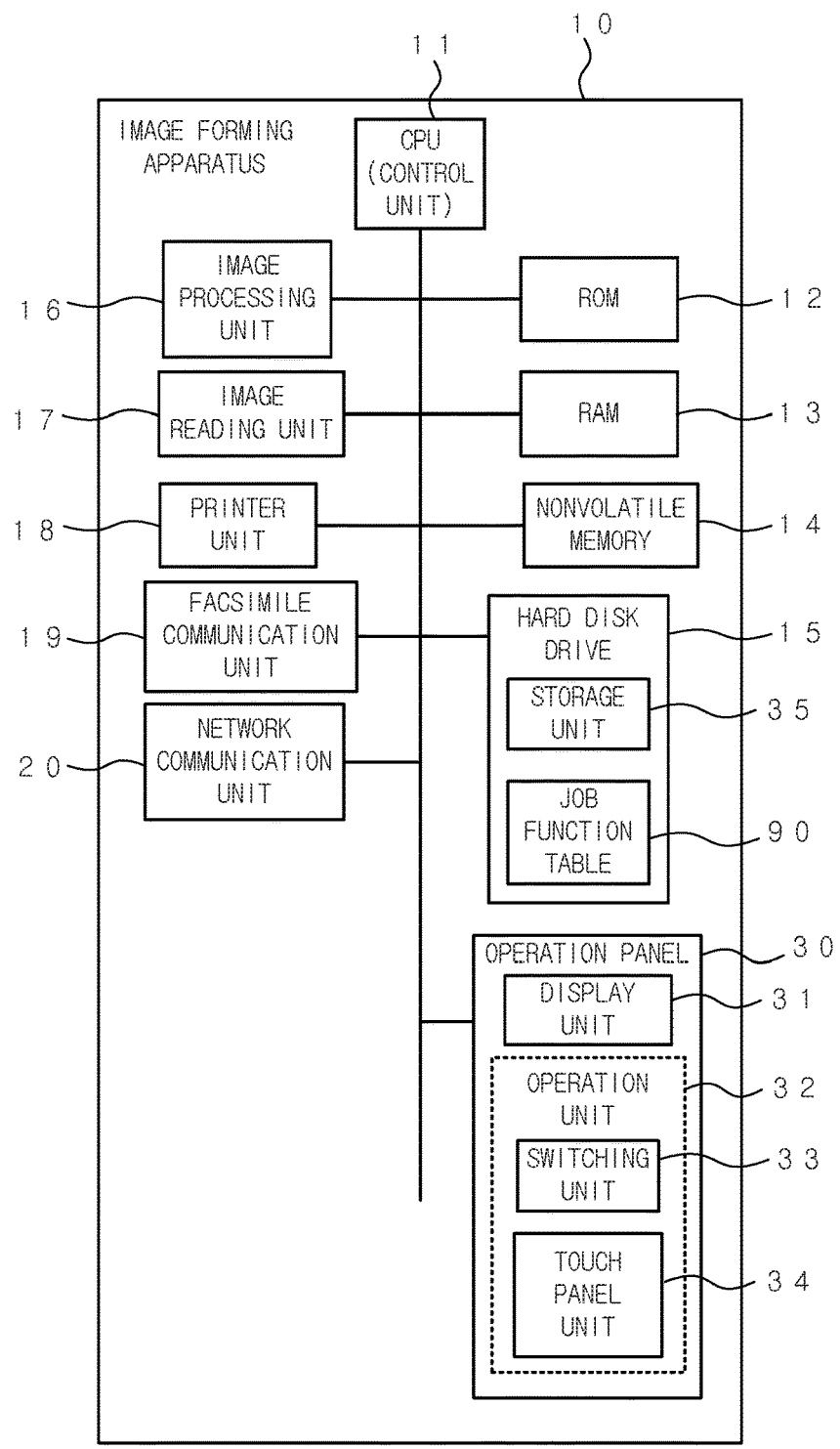
FIG. 4 is a block diagram showing the schematic configuration of the image forming apparatus according to the embodiments.

FIG. 4 is a block diagram showing the schematic configuration of the image forming apparatus 10 according to the embodiment. The image forming apparatus 10 comprises a CPU (Central Processing Unit) 11 for controlling the whole operation of the image forming apparatus 10. The CPU 11 is connected with a ROM (Read Only Memory) 12, a RAM (Random Access Memory) 13, a nonvolatile memory 14, a hard disk drive 15, an image processing unit 16, an image reading unit 17, a printer unit 18, a facsimile communication unit 19, a network communication unit 20, an operation panel 30, and the like via a bus.

By the CPU 11, middleware, application programs, and the like are executed on an OS (Operating System) program as a base. Further, the CPU 11 functions as the control unit (display control unit) that controls the display contents of the operation panel 30.

In the ROM 12, various types of programs are stored. The CPU 11 executes various types of processes in accordance with these programs. As a result, each function of the image forming apparatus 10 is realized. In the ROM 12, the program for controlling the image forming apparatus 10 by the CPU 11, is stored.

The RAM 13 is used as a work memory for temporarily storing various pieces of data when the CPU 11 carries out the process in accordance with the programs, and an image memory for storing image data.

The nonvolatile memory 14 is a memory (flash memory) in which the stored contents are not damaged even if the image forming apparatus 10 is turned off. The nonvolatile memory 14 is used for storing various types of setting information, and the like.

The hard disk drive 15 is a large-capacity nonvolatile storage device. The OS program, various types of application programs, user information, print data, image data, job histories, and the groups of the operation buttons 81 are stored in the storage unit 35. Further, in the embodiment, a job function table 90 indicating the functions related to each type of jobs is stored in the hard disk drive 15.

The image processing unit 16 carries out the rasterizing process for converting print data into image data, the compression/decompression process for the image data, and the like in addition to the processing, such as the enlargement/reduction or the rotation of image data.

The image reading unit 17 has a function of obtaining image data by optically reading an image of an original. The image reading unit 17 comprises, for example, a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal output from the line image sensor into digital image data, and the like.

The printer unit 18 has a function of forming an image on the recording paper in accordance with the image data. In this embodiment, the printer unit 18 is configured as a so-called laser printer comprising a conveying device for the recording paper, a photoconductive drum, a charging device, a laser unit, a developing device, a transfer and separation device, a cleaning device, and a fixing device. The laser printer carries out the image forming by the electrophotographic process. The image forming may be carried out by another process.

The facsimile communication unit 19 has a function of transmitting and receiving the image data to/from an external device having the facsimile function via the public line.

The network communication unit 20 has a function of communicating the data with an external device via a network such as LAN.

The operation panel 30 includes the display unit 31 and the operation unit 32. The operation unit 32 includes a switching unit 33, such as a start button, a return button and the like, and a touch panel unit 34. Further, the operation unit 32 receives the operation to the operation button 81 displayed in the display area of the display unit 31. The display unit 31 comprises a liquid crystal display (LCD) and the like, and has a function of displaying various types of operation windows, setting windows and the like. In the present embodiment, the CPU 11 controls the display contents displayed by the operation panel 30 and the reception of the operations via the operation panel 30.

The touch panel unit 34 is provided on the display unit 31. The touch panel unit 34 detects a touch position (a coordinate position) at which the display unit 31 is pressed down by a touch pen, user's finger or the like. The CPU 11 recognizes a flick operation, a drag operation or the like from the change in the touch position which is continuously detected (operation information).

Next, the method for determining whether the button identification information protrudes from the display area of the display unit 31 in case that the button identification information is displayed in the first display mode, and an example of the button identification information displayed in the changed display mode will be explained.

Figure 5:
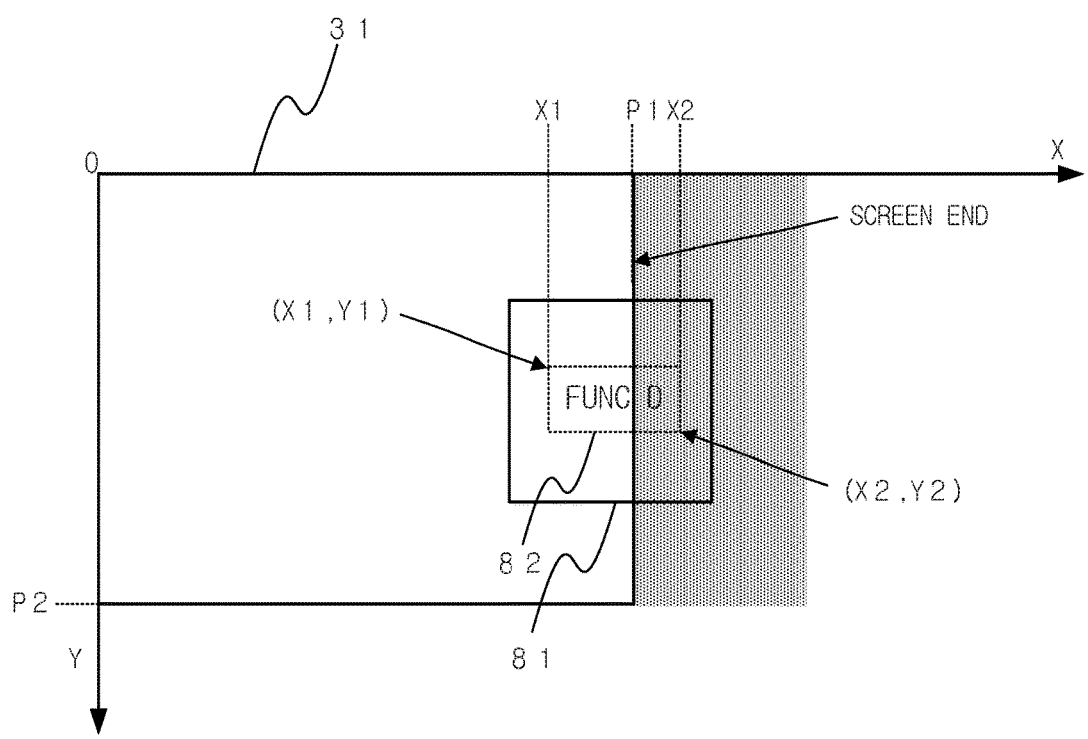
FIG. 5 shows the positional relationship between the display area, the operation button and the button identification information displayed in the first display mode in case that the display area of the display unit is indicated by the coordinates.
Figure 6:
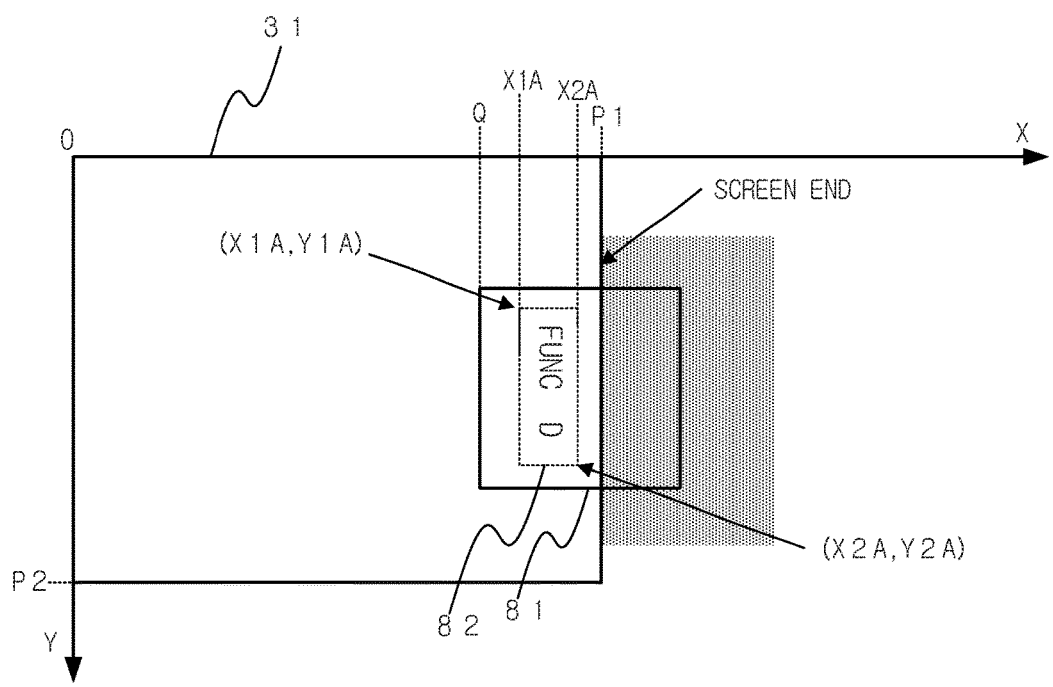
FIG. 6 shows the positional relationship between the display area, the operation button and the button identification information displayed in the changed display mode in case that the display area of the display unit is indicated by the coordinates.

FIGS. 5 and 6 show the case in which the button identification information is displayed in the first display mode and the changed display mode in the state in which the right side part of the operation button 81 protrudes from the display area of the display unit 31.

FIG. 5 shows the case in which the button identification information is displayed in the first display mode. In the embodiment, the CPU 11 determines whether the display range 82 having the rectangular form in which the button identification information is enclosed and in which the opposite sides are parallel to the opposite sides of the display area of the display unit 31, respectively, protrudes from the display area of the display unit 31.

First, in case that the upper left end of the display area is set to (0, 0) and the lower right end is set to (P1, P2), the coordinates of the opposite angles positioned at the upper left end and the lower right end of the display range 82 are obtained. In the coordinates of the opposite angles of the display range 82 in the first display mode, the coordinate of the upper left end is (X1, Y1) and the coordinate of the lower right end is (X2, Y2). Based on the obtained coordinates of the opposite angles, the display range 82 is specified and it is determined whether the specified range protrudes from the display range of the display unit 31. In the embodiment, because the scrolling is executed only in the right and left direction with respect to the display area, the button identification information protrudes only in the right and left direction. Accordingly, in case that the inequalities $0 \leq X1 \leq P1$ and $P1 < X2$ are satisfied or the inequalities $X1 < 0$ and $0 \leq X2 \leq P1$ are satisfied, it is determined that the button identification information protrudes from the display area.

FIG. 6 shows the case in which the button identification information is displayed in the changed display mode. In the changed display mode according to the embodiment, the display range 82 is set so as to display the whole button identification information in the display area of the display unit 31. Specifically, in case that the coordinate of the upper left end of the display range 82 is set to (X1A, Y1A) and the coordinate of the lower right end of the display range 82 is set to (X2A, Y2A), the display mode of the button identification information is changed so as to contain both of the above coordinates in the operation button 81 in which the button identification information is described and to satisfy the inequalities $0 \leq X1A \leq P1$, $0 \leq X2A \leq P1$, $0 \leq Y1A \leq P2$ and $0 \leq Y2A \leq P2$.

As the method for changing the display mode of the button identification information, for example, at least one of the reduction of the button identification information, the change in the array of the button identification information, the change in the arrangement position of the button identification information and the omission indication is adopted.

In the above-described reduction of the button identification information, for example, the size of a text, an icon or the like is reduced. In the change in the array of the button identification information, for example, the information which is horizontally written is rewritten vertically, such as the information is rotated by 90 degrees or the like, the position at which a new line of the text is started is changed, the interval of characters is narrowed, or the like. In the change in the arrangement position of the button identification information, for example, the centered information is left-justified or right-justified. In the omission indication, for example, the button identification information is omitted except only the minimum characters required to identify one function from the others. For example, in case of the FUNC D, the button identification information is omitted except only the character of "D".

The display mode may be changed only when the scrolling is stopped, or may be always changed during the scrolling. During the scrolling, the display mode may be changed only in case that the scroll speed is the predetermined value or less.

FIGS. 7 to 11 show the situation in which the display mode of the button identification information is changed in case that the display mode is changed during the scrolling. In FIGS. 7 to 11, the operation button 81 (or apart of the operation button 81) that is positioned outside the window displayed by the display unit 31 (out of the screen), is shown by a broken line.

Figure 7:
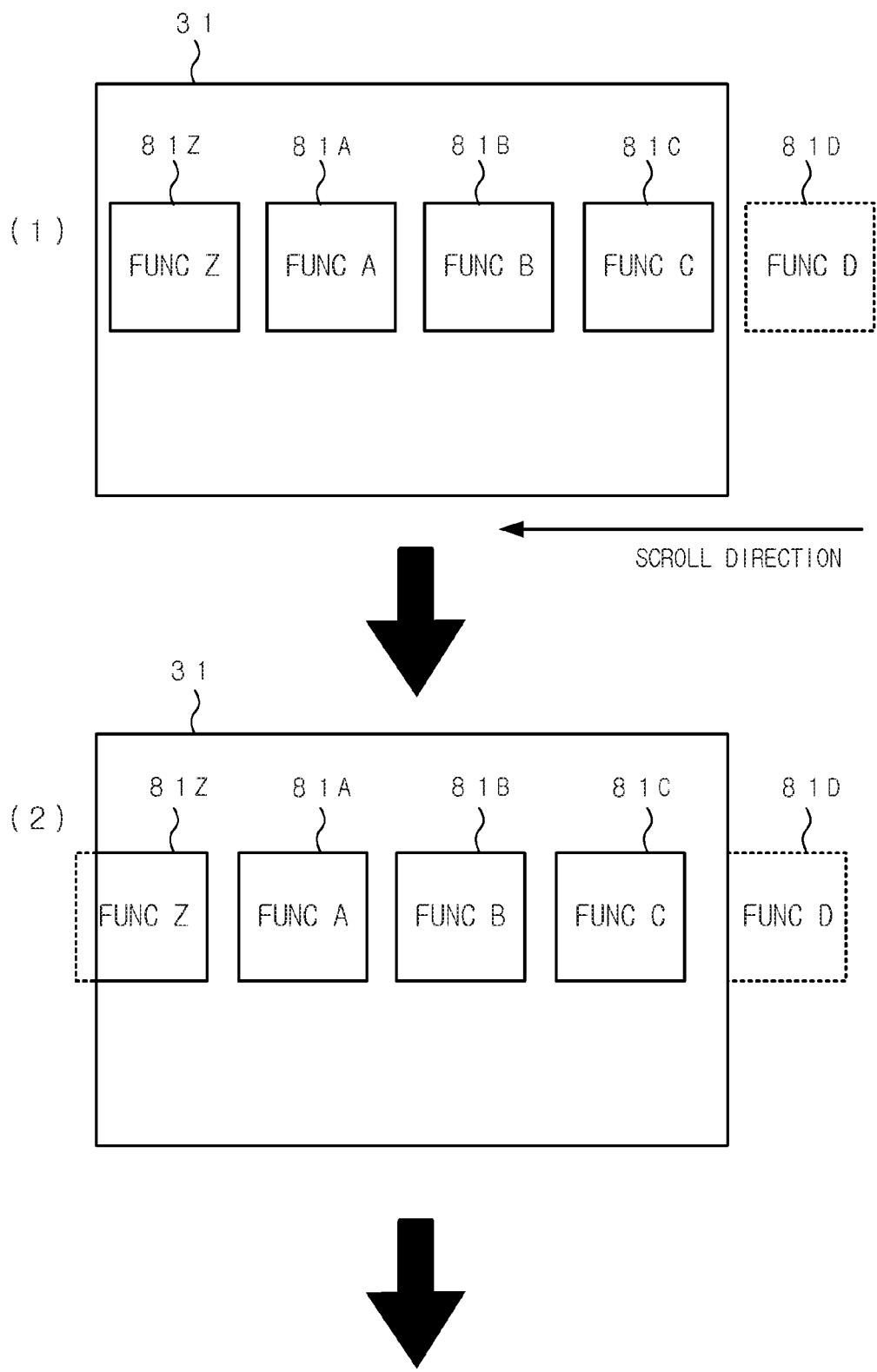
FIG. 7 shows an example of the display contents in case that the scroll display is started.

FIG. 7 (1) shows the state before the scrolling is started. In this state, four operation buttons 81 (operation buttons 81Z, 81A, 81B, 81C and 81D in order from the left side) are displayed. The button identification information of the FUNC Z is described in the operation button 81Z in the first display mode. The button identification information of the FUNC A is described in the operation button 81A in the first display mode. The button identification information of the FUNC B is described in the operation button 81B in the first display mode. The button identification information of the FUNC C is described in the operation button 81C in the first display mode. In addition, the operation button 81D in which the button identification information of the FUNC D is described waits on the right side of the operation button 81C outside of the screen.

FIG. 7 (2) shows the situation in which the scrolling is started in the left direction from the right. A part of the operation button 81Z protrudes from the screen (the left side of the screen). However, because the whole button identification information of the FUNC Z is displayed in the screen, the button identification information of the FUNC Z is displayed in the first display mode.

Figure 8:
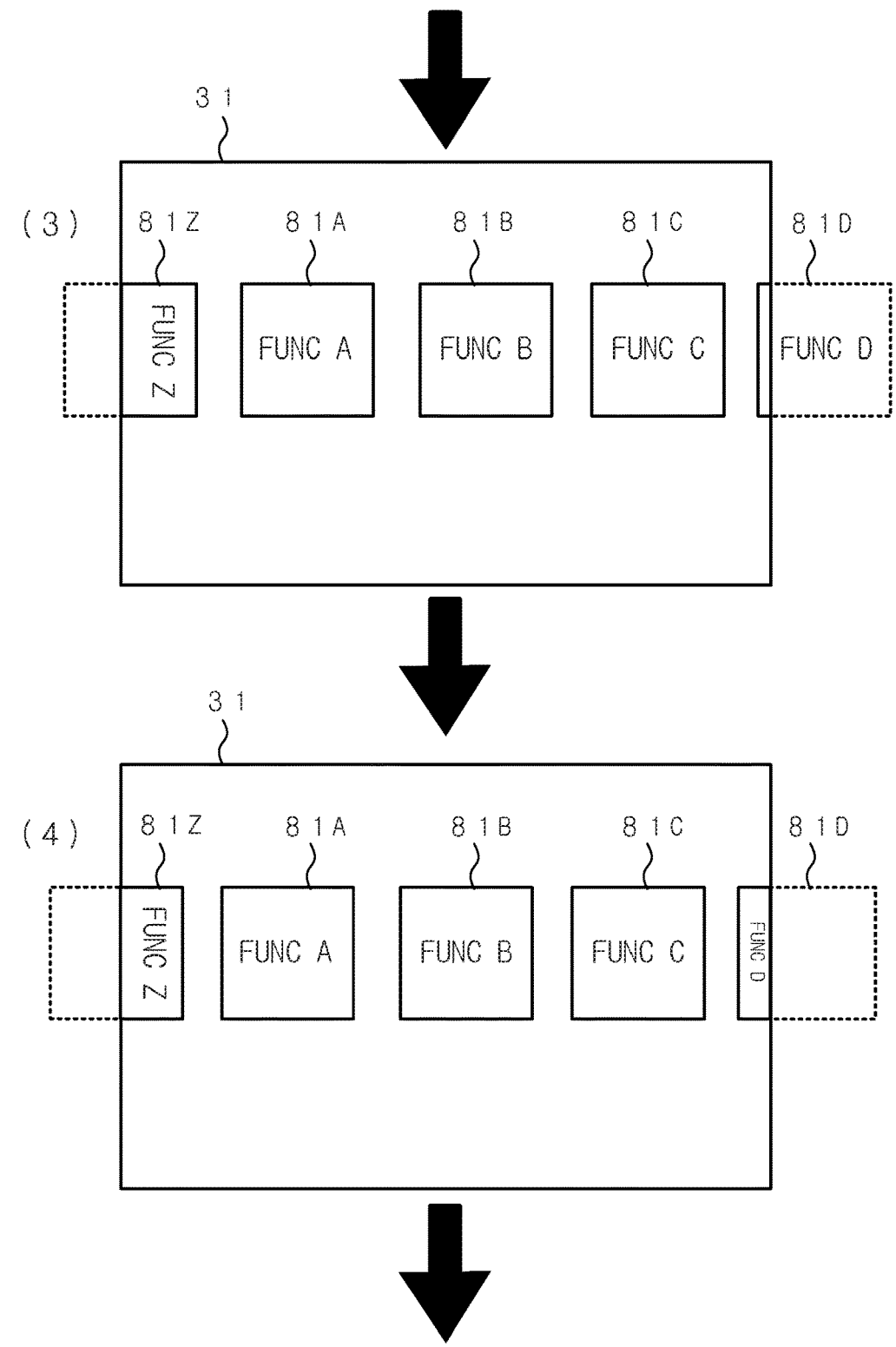

FIG. 8 (3) shows the situation in which the scrolling is further advanced from the state of FIG. 7 (2) In FIG. 8 (3), in case that the button identification information of the FUNC Z is displayed in the first display mode, a part of the button identification information protrudes from the screen. Therefore, the button identification information of the FUNC Z is displayed by changing the display mode of the button identification information to the changed display mode. On the other hand, a part of the operation button 81D is newly displayed on the screen. At this time, in case that the button identification information of the FUNC D is displayed in the first display mode, the whole button identification information is positioned out of the screen. Therefore, the display mode of the button identification information is not changed. That is, the button identification information of the FUNC D is still displayed in the first display mode.

FIG. 8 (4) shows the situation in which the scrolling is further advanced from the state of FIG. 8 (3). In FIG. 8 (4), the button identification information of the FUNC Z is displayed in the display mode which is the same as that of FIG. 8 (3) (the changed display mode). On the other hand, in case that the button identification information of the FUNC D is displayed in the first display mode, a part of the button identification information protrudes from the screen. Therefore, the button identification information of the FUNC D is displayed by changing the display mode of the button identification information to the changed display mode. In FIG. 8 (4), the range of the operation button 81D, which is displayed on the screen is narrower than that of the operation button 81Z, and the button identification information of the FUNC D is displayed smaller than the button identification information of the FUNC Z.

FIG. 9 (5) shows the situation in which the scrolling is further advanced from the state of FIG. 8 (4). In FIG. 9 (5), the button identification information of the FUNC Z is displayed in the display mode which is the same as that of FIG. 8 (4) (the changed display mode). The button identification of the FUNC D is still displayed in the changed display mode. Because the range of the operation button 81D, which is displayed on the screen becomes wider, the button identification information of the FUNC D is displayed larger than the button identification information shown in FIG. 8 (4) FIG. 9 (6) shows the situation in which the scrolling is further advanced from the state of FIG. 9 (5).

In FIG. 9 (6), the display mode of the button identification information of the FUNC Z is still the changed display mode. Because the range of the operation button 81Z, which is displayed on the screen becomes smaller, the button identification information of the FUNC Z is reduced and displayed in accordance with the above range. The button identification information of the FUNC D is displayed in the display mode which is the same as that of FIG. 9 (5) (the changed display mode).

FIG. 10 (7) shows the situation in which the scrolling is further advanced from the state of FIG. 9 (6). In FIG. 10 (7), in case that the button identification information of the FUNC Z is displayed in the first display mode, the whole button identification information is positioned out of the screen. Therefore, the display mode of the button identification information of the FUNC Z is returned to the first display mode. That is, the button identification information of the FUNC Z is not displayed. The button identification information of the FUNC D is displayed in the display mode which is the same as that of FIG. 9 (6) (the changed display mode).

FIG. 10 (8) shows the situation in which the scrolling is further advanced from the state of FIG. 10 (7). In FIG. 10 (8), a part of the operation button 81Z is displayed, and the button identification information of the FUNC Z is not displayed similar to FIG. 10 (7). Further, the range of the operation button 81D, which is displayed on the screen becomes wider, and even if the button identification information of the FUNC D is displayed in the first display mode, the whole button identification information can be displayed on the screen. Therefore, the button identification information of the FUNC D is displayed by returning the display mode of the button identification information to the first display mode.

Figure 11:
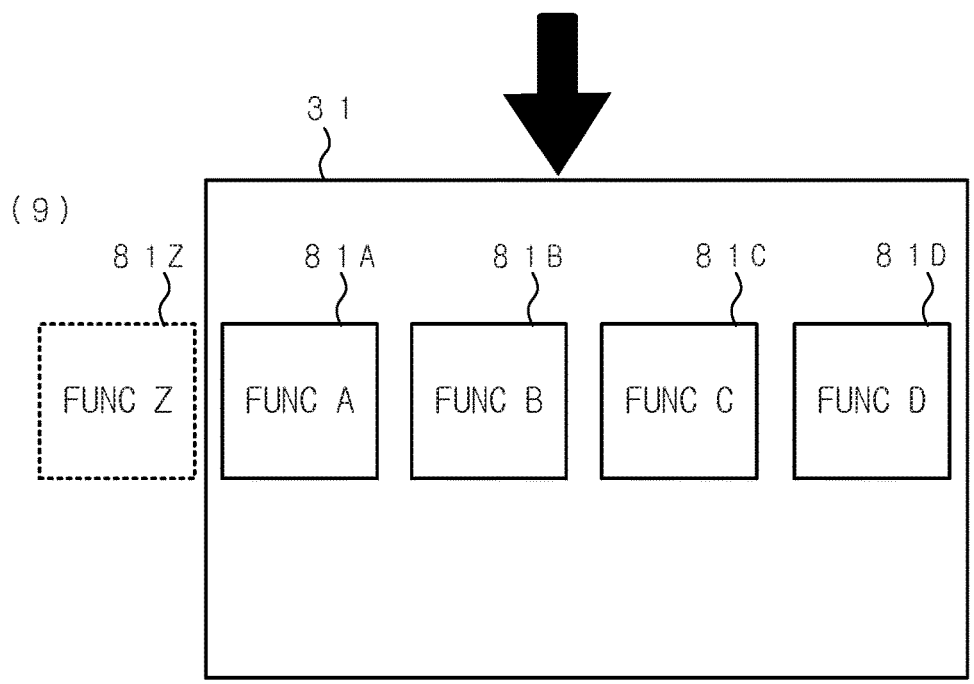
FIG. 11 shows an example of the display contents in case that the scrolling is completed.

FIG. 11 (9) shows the situation in which the scrolling is further advanced from the state of FIG. 10 (8). In FIG. 11 (9), the whole operation button 81Z is positioned out of the screen. On the other hand, the whole operation button 81D is displayed on the screen. The button identification information of the FUNC D is still displayed in the first display mode.

As described above, when the display mode is changed also during the scrolling, the size of the button identification information is optimized every time so as to display the whole button identification information on the screen in accordance with the range of the operation button 81, which is displayed on the screen at various timings. Further, the above-described optimization may be performed by changing the array of the button identification information, changing the arrangement position of the button identification information, omitting the indication of the button identification information, and the like, in addition to the change in the size of the button identification information.

Second Embodiment:

In the first embodiment, in case that when the button identification information of all of the operation buttons 81 is displayed in the first display mode, a part of the button identification information protrudes from the display area of the display unit 31, the button identification information is displayed by changing the display mode of the button identification information to the changed display mode. In the second embodiment, a plurality of the operation buttons 81 are grouped. Then, in case that one operation button 81 belonging to one group is displayed in the position in which the above-described button identification information protrudes and the other operation buttons 81 belonging to the group which is the same as the group to which the one operation button 81 belongs are not displayed in the display area of the display unit 31, the button identification information of the one operation button 81 is displayed in the first display mode. Further, in case that one operation button 81 belonging to one group is displayed in the position in which the above-described button identification information protrudes and at least one of the other operation buttons 81 belonging to the group which is the same as the group to which the one operation button 81 belongs is displayed in the display area of the display unit 31, the button identification information of the one operation button 81 is displayed by changing the display mode of the button identification information to the changed display mode.

Also in the second embodiment, the hardware configuration of the image forming apparatus 10 is the same as that of the image forming apparatus 10 according to the first embodiment. Further, in the second embodiment, the difference between the second embodiment and the first embodiment will be explained and the explanation of the same part will be appropriately omitted.

Figure 12:
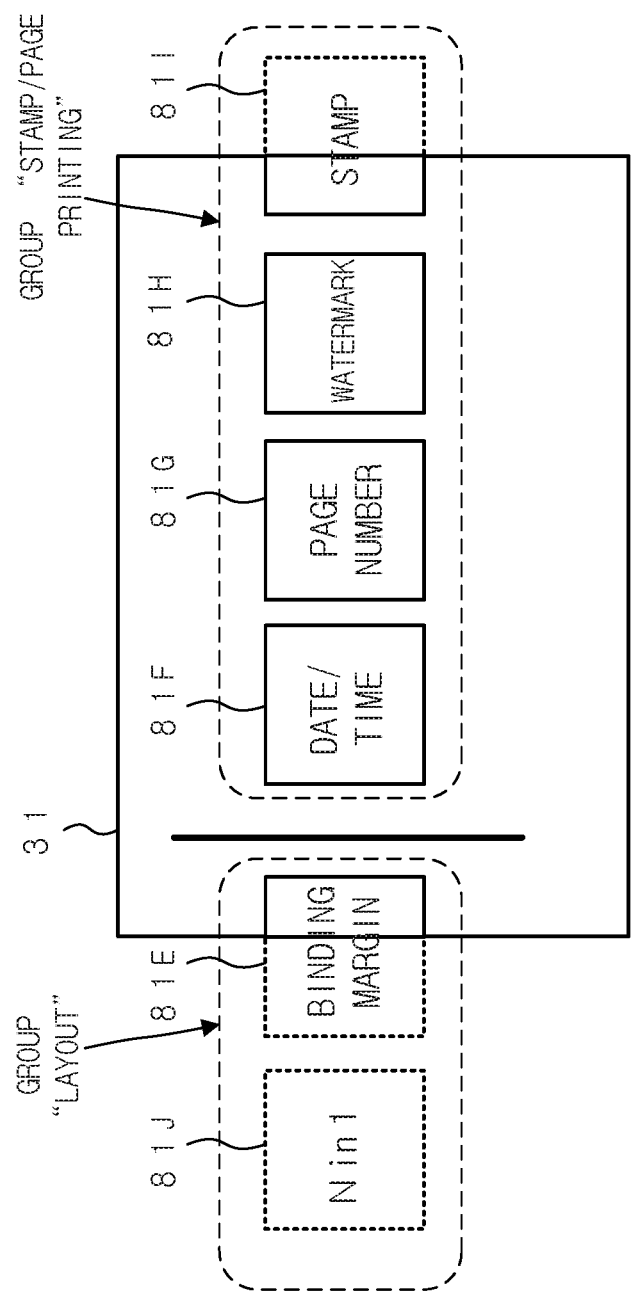
FIG. 12 shows an example of the groups formed by a plurality of operation buttons.

FIG. 12 shows an example of the groups of the operation buttons 81 and an example of the window showing the situation before the display mode is changed. In FIG. 12, the operation buttons 81 belonging to any of two groups "Layout" and "Stamp/Page printing" are displayed on the display unit 31.

Specifically, in FIG. 12, five operation buttons which are operation buttons 81E, 81F, 81G, 81H and 81I are displayed. The button identification information relating to the binding margin is described in the operation button 81E, the button identification information relating to the date/time is described in the operation button 81F, the button identification information relating to the page number is described in the operation button 81G, the button identification information relating to the watermark is described in the operation button 81H, and the button identification information relating to the stamp is described in the operation button 81I. Further, in case that the button identification information relating to the binding margin and the button identification information relating the stamp is displayed in the first display mode, a part of the button identification information protrudes from the display area of the display unit 31.

In FIG. 12, the operation button 81E belongs to the group "Layout" with the operation button 81J (in which the button identification information relating to the Nin 1 is described) that is out of the screen and is positioned on the left side of the screen. On the other hand, the operation buttons 81F, 81G, 81H and 81I belong to the group "Stamp/Page printing". In the embodiment, the operation buttons 81 forming one group are adjacent to each other, and in the drawing, each group is enclosed by a broken line.

Figure 13:
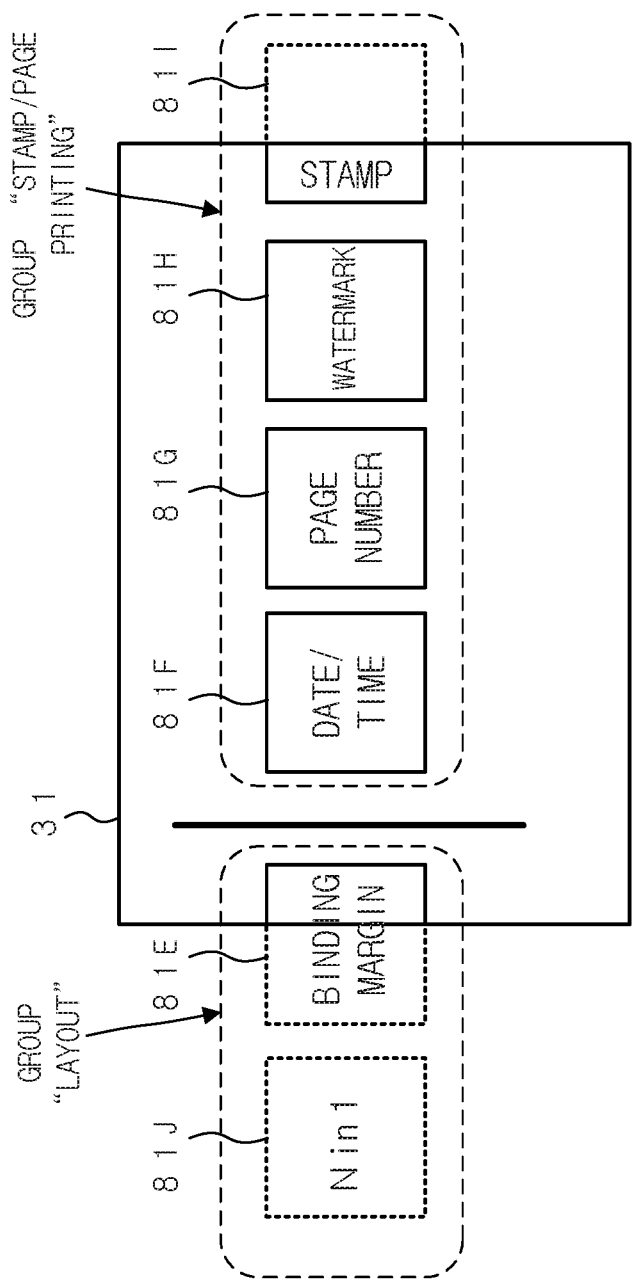
FIG. 13 shows an example of the display contents which are displayed on the display unit in case that the display mode is changed by using the method according to the second embodiment.

FIG. 13 shows an example in case that the display mode of the button identification information in the window displayed in FIG. 12, is changed by the method according to the second embodiment. Because the other operation button 81J belonging to the group which is the same as the group to which the operation button 81E belongs is not displayed in the display area of the display unit 31, the display mode of the button identification information relating to the binding margin is not changed and the button identification information is still displayed in the first display mode. On the other hand, because the operation buttons 81F, 81G and 81H that are the other operation buttons 81 belonging to the group which is the same as the group to which the operation button 81I belongs to are displayed on the display unit 31, the button identification information relating to the stamp is displayed by changing the display mode of the button identification information relating to the stamp to the changed display mode. As a result, the user can view the whole button identification information relating to the stamp.

In case that when the button identification information of one operation button 81 is displayed in the first display mode as described above, a part thereof protrudes from the screen, the button identification information is displayed as follows. When at least one of the other operation buttons 81 belonging to the group which is the same as the group to which the one operation button 81 belongs is displayed on the display unit 31, the button identification information is displayed by changing the display mode of the button identification information to the changed display mode which is different from the first display mode. When the other operation buttons 81 belonging to the group which is the same as the group to which the one operation button 81 belongs are not displayed on the display unit 31, the first display mode is not changed yet and the button identification information is displayed in the state in which a part of the button identification information protrudes from the display area of the display unit 31. As a result, whether the operation button displayed in the state in which a part of the operation button is lack at the end of the screen belongs to the group which is the same as the group to which the adjacent operation button which is wholly displayed on the screen belongs can be recognized based on the difference in the display mode of the button identification information.

Third Embodiment:

In the first embodiment, in case that when the button identification information is displayed in the first display mode in all of the operation buttons 81, a part of the button identification information protrudes from the display area of the display unit 31, the button identification information is displayed by changing the display mode of the button identification information to the changed display mode. In the third embodiment, in case that the operation button 81 related to the set setting item is displayed in the position in which the above-described button identification information protrudes, the button identification information of the related operation button 81 is displayed by changing the display mode of the button identification information to the display mode different from the first display mode. On the other hand, in case that the operation button 81 that is not related to the set setting item is displayed in the position in which the above-described button identification information protrudes, the button identification information of the non-related operation button 81 is displayed in the first display mode.

Also in the third embodiment, the hardware configuration of the image forming apparatus 10 is the same as that of the image forming apparatus 10 according to the first and second embodiments. Further, in the third embodiment, the difference between the third embodiment and the first and second embodiments will be explained and the explanation of the same part will be appropriately omitted.

Figure 14:
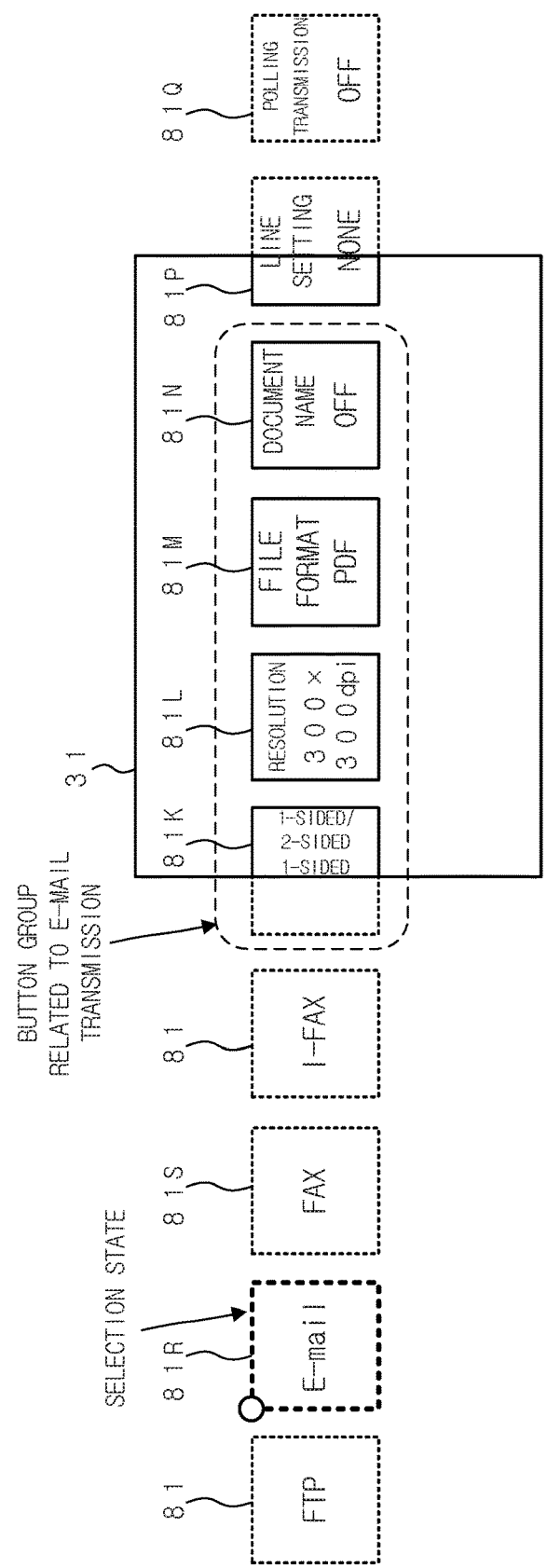
FIG. 14 shows an example of the display contents which are displayed on the display unit in case that the setting item of E-mail has been set, according to the third embodiment.

FIG. 14 shows an example of the display contents in which the operation buttons 81 are displayed so as to describe the button identification information by changing the display mode of the button identification information by the method according to the third embodiment. In FIG. 14, five operation buttons 81 which are operation buttons 81K, 81L, 81M, 81N and 81P are displayed on the display unit 31. The button identification information relating to the 1-sided/2-sided is described in the operation button 81K, the button identification information relating to the resolution is described in the operation button 81L, the button identification information relating to the file format is described in the operation button 81M, the button identification information relating to the document name is described in the operation button 81N, and the button identification information relating to the line setting is described in the operation button 81P. In FIG. 14, in case that the button identification information relating to the 1-sided/2-sided and the button identification information relating to the line setting is displayed in the first display mode, a part of the button identification information protrudes from the display area of the display unit 31.

In FIG. 14, the operation button 81R that is out of the screen is in the set state (selection state, and the operation button 81R is a button related to the setting item to which the function of E-mail is assigned.

The operation buttons 81K, 81L, 81M and 81N are the operation buttons 81 related to the setting item of E-mail. In the drawing, the button group formed by the operation buttons 81 related to the setting item of E-mail is shown by being enclosed by a broken line. Therefore, in FIG. 14, the button identification information relating to the 1-sided/2-sided is displayed by changing the display mode of the button identification information to the changed display mode. As a result, the user can view the whole button identification information relating to the 1-sided/2-sided. On the other hand, because the operation button 81P is not the operation button 81 related to the setting item of E-mail, the display mode is still the first display mode and the button identification information relating to the line setting is displayed.

Figure 15:
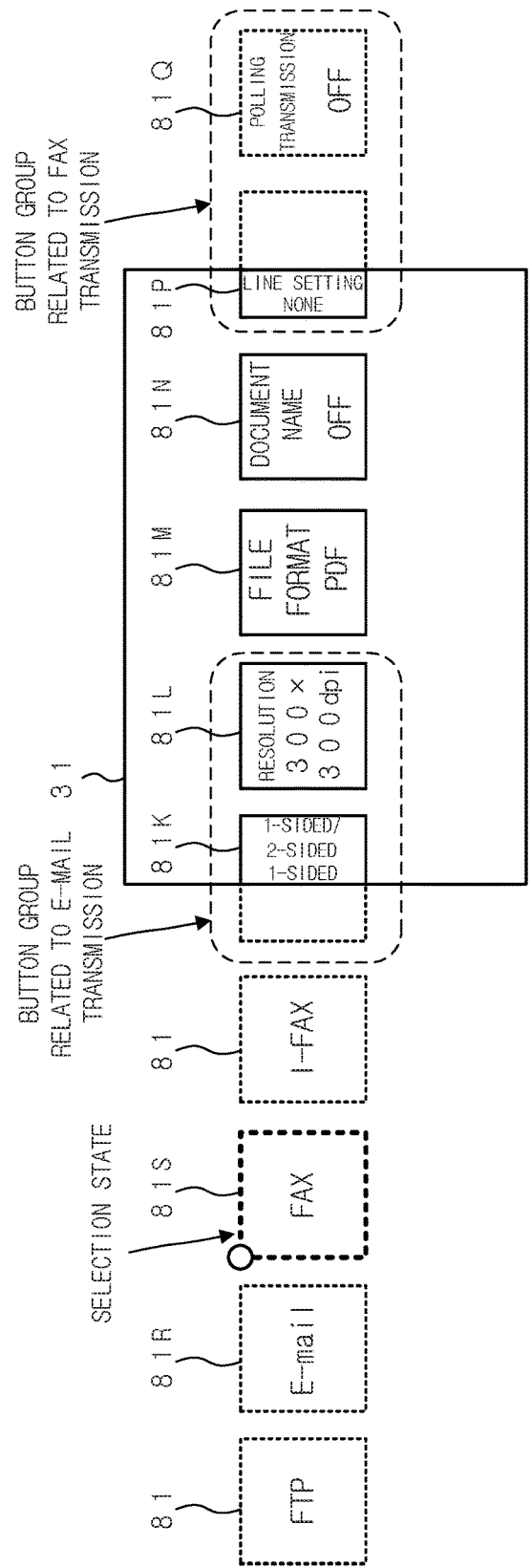
FIG. 15 shows an example of the display contents which are displayed on the display unit in case that the setting item of the facsimile has been set, according to the third embodiment.

FIG. 15 shows the display contents in case that the window position which is the same as that of FIG. 14 is displayed in the state in which the setting item other than E-mail is set. In FIG. 15, the operation button 81S that is out of the screen is set (in the selection state), and the operation button 81S is a button related to the setting item to which the function of the facsimile (FAX) is assigned. Because the window position which is the same as that of FIG. 14 is displayed, also in FIG. 15, in case that the button identification information relating to the 1-sided/2-sided and the button identification information relating to the line setting is displayed in the first display mode, a part of the button identification information protrudes from the display area of the display unit 31.

The operation buttons 81K, 81L and 81P and the operation button 81Q which is out of the screen and is positioned on the right side of the operation button 81P and in which the button identification information relating to the polling transmission is described, are the operation buttons 81 related to the setting item of the facsimile. In the drawing, the button group formed by the operation buttons 81 related to the setting item of the facsimile is shown by being enclosed by a broken line. Therefore, in FIG. 15, and the button identification information relating to the 1-sided/2-sided and the button identification information relating to the line setting is displayed by changing the display mode of the button identification information to the changed display mode. As a result, the user can view the whole button identification information relating to the 1-sided/2-sided and the line setting.

The operation buttons 81 related to each setting item are registered in the job function table 90 in the hard disk drive 15. FIG. 16 shows the job function table 90. In FIG. 16, the file transfer compliant with the FTP (File Transfer Protocol) command, E-mail, and facsimile are registered as the setting item (job type).

The 1-sided/2-sided, the resolution, the file format and the document name are related to the file transfer compliant with the FTP command and the E-mail. The 1-sided/2-sided, the resolution, the line setting, and the polling transmission are related to the facsimile. In case that when the button identification information is displayed in the first display mode, the operation button 81 in which a part of the button identification information protrudes from the display area of the display unit 31 is displayed, the CPU 11 determines whether that operation button 81 is the operation button 81 related to the set setting item, with reference to the job function table 90.

As described above, in case that the operation button 81 displayed in the position in which the button identification information protrudes from the display area of the display unit 31 is related to the set setting item, the display mode of the button identification information is changed to the changed display mode. On the other hand, in case that the operation button 81 is not related to the set setting item, the display mode of the button identification information is not changed to the changed display mode. Therefore, it is possible to easily recognize whether the operation button 81 displayed in the position in the button identification information protrudes is the operation button 81 related to the set setting item, based on the difference in the display mode.

Figure 17:
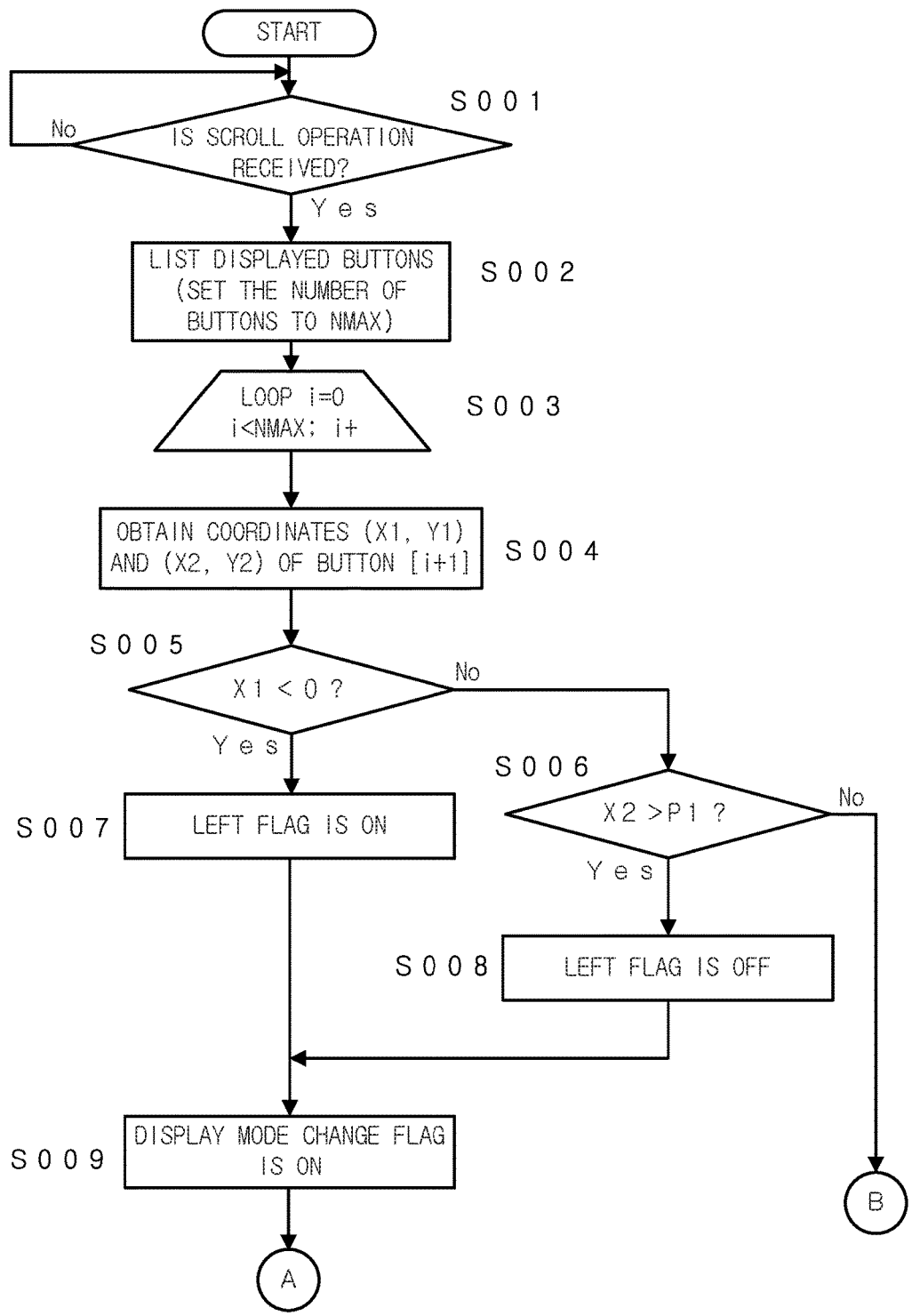
FIGS. 17 to 19 are a flowchart showing the process performed by the image forming apparatus.
Figure 18:
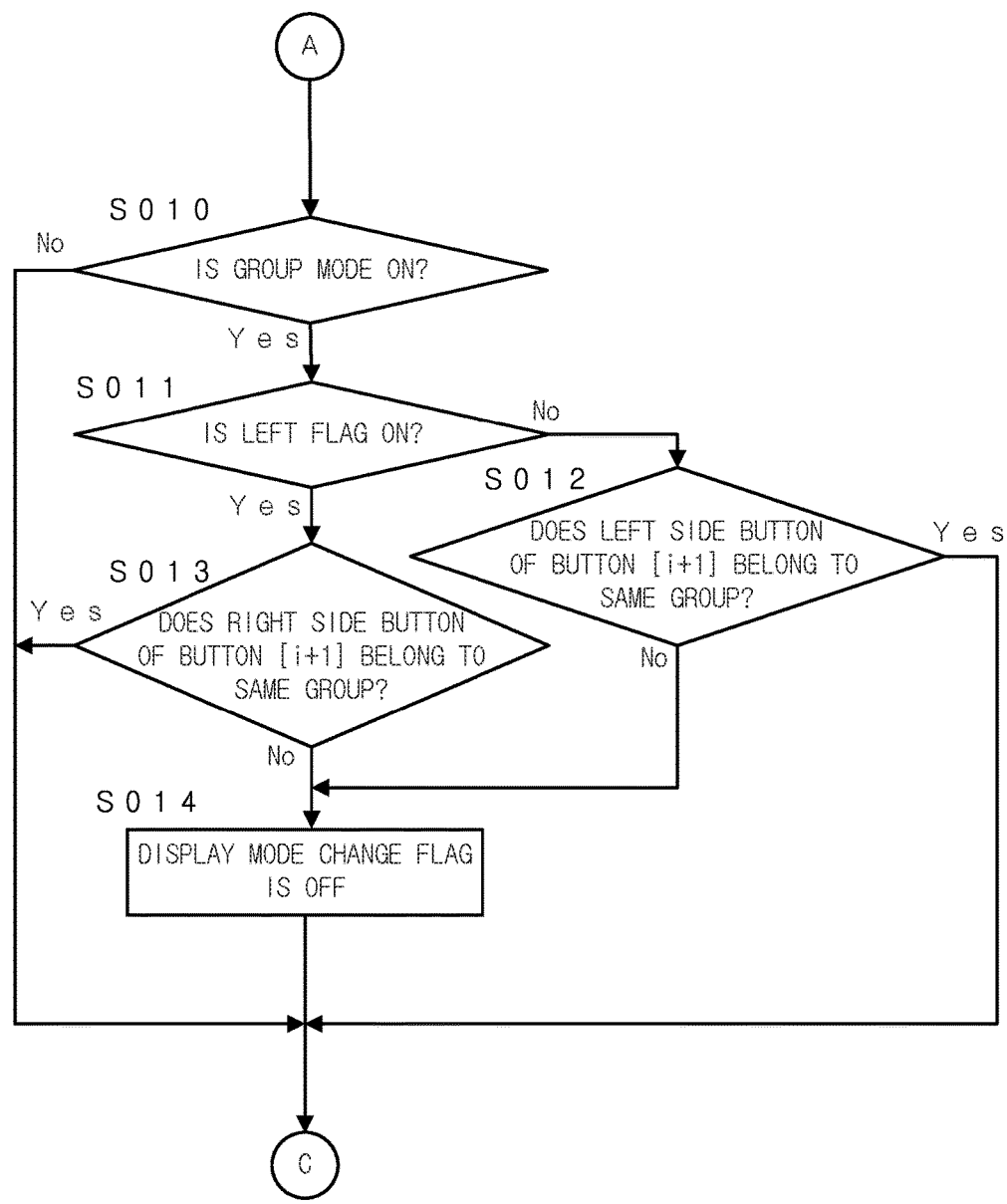
Figure 19:
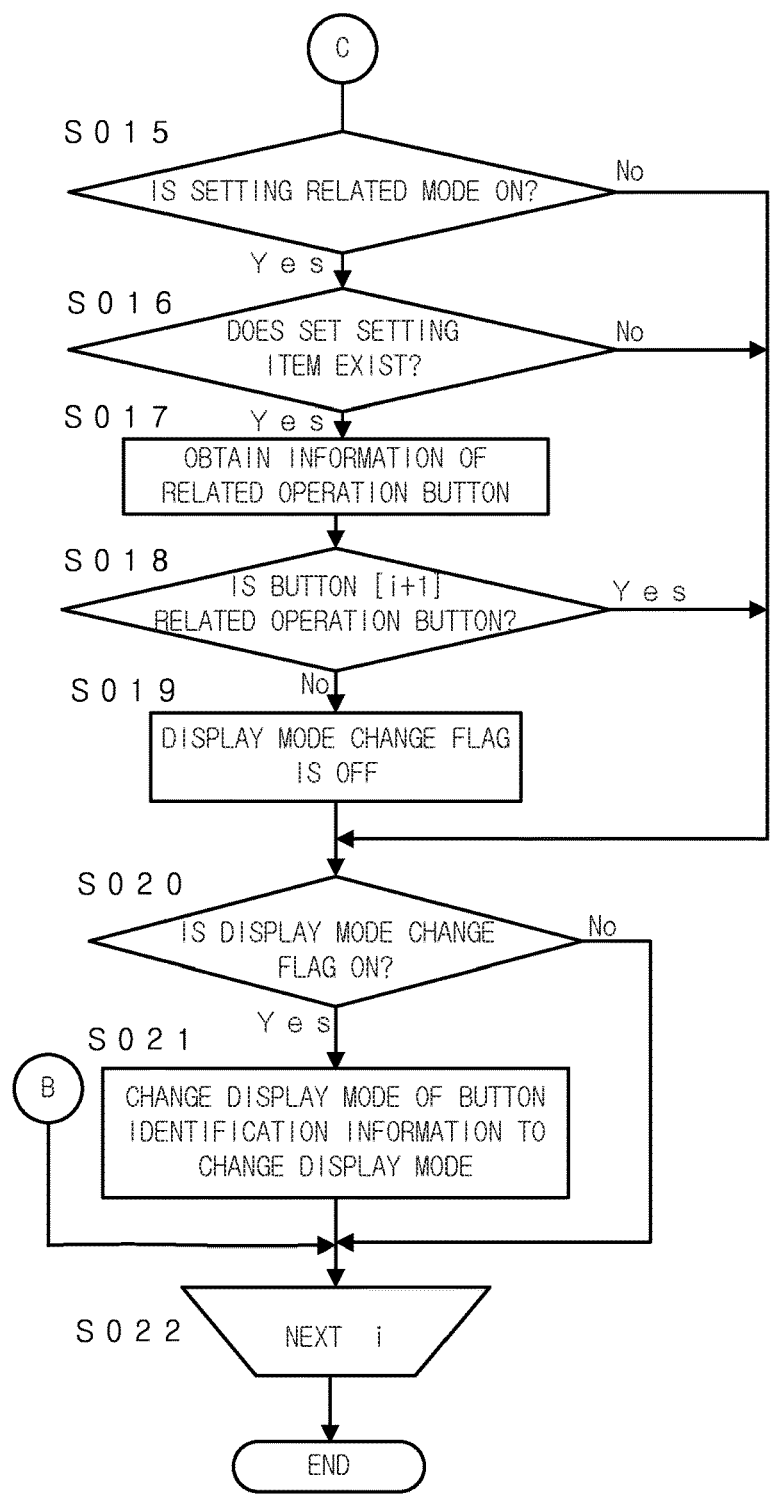

Next, the process performed by the image forming apparatus 10 will be explained. FIGS. 17 to 19 are a flowchart showing the process performed by the image forming apparatus 10. By executing the programs stored in the ROM 12 or the storage unit 35 of the hard disk drive 15 by the CPU 11, the image forming apparatus 10 realizes the process shown in the flowchart of FIGS. 17 to 19.

In the explanations of FIGS. 17 to 19, the image forming apparatus 10 has the group mode and the setting related mode as the display control modes for controlling the display contents displayed on the display unit 31. Further, the selection operation for setting the validity/invalidity of each mode is previously received from the user. In case that the group mode is valid, the image forming apparatus 10 changes the display mode by the method according to the second embodiment. On the other hand, in case that the setting related mode is valid, the image forming apparatus 10 changes the display mode by the method according to the third embodiment.

First, the image forming apparatus 10 waits for the reception of the scroll operation from the user to a plurality of the operation buttons 81 displayed on the display unit 31 (FIG. 17, Step S001; No). In case that the scroll operation is received (Step S001; Yes), the image forming apparatus 10 lists the operation buttons 81 displayed on the display unit 31 (Step S002). Here, the number of the listed operation buttons 81 is set to NMAX.

Hereinafter, in case that specific condition is satisfied, the process from Step S003 of FIG. 17 to Step S022 of FIG. 19 (referred to as the display determination processing) is repeated. In Step S003, the number of times the display determination processing is repeated since the process is started is i, and when the initial display determination processing is started, i is set to 0. The specific condition is that the inequality i<NRMAX is satisfied, and in Step S003, it is determined whether the specific condition is satisfied.

In Step S003, in case that the specific condition (i<NMAX) is satisfied, firstly, the CPU 11 obtains the coordinates (X1, Y1) and (X2, Y2) of opposite angles in the display range 82 of the button identification information in any one of the operation buttons 81 displayed on the display unit 31 (Step S004). In the embodiment, the values 1, 2, 3, ..., NMAX are assigned to the plurality of operation buttons 81 displayed on the display unit 31 in order from the left side based on the positions at which the operation buttons 81 are displayed. Further, the coordinates of the opposite angles in the display range 82 of the operation button 81 having the value of i+1 are obtained.

In case that the inequality X1<0 is satisfied by using the value X1 of the obtained coordinates (Step S005; Yes), the left flag is set to ON in Step S007, and the process proceeds to Step S009. In case that the inequality X1<0 is not satisfied (Step S005; No), it is checked whether the inequality X2>P1 is satisfied (Step S006).

In case that the inequality X2>P1 is satisfied (Step S006; Yes), the left flag is set to OFF in Step S008, and the process proceeds to Step S009 In case that the inequality X2>P1 is not satisfied (Step S006; No), the process proceeds to Step S022 of FIG. 19.

In Step S009, the display mode change flag is set to ON, and the process proceeds to Step S010 of FIG. 18. In Step S004 to Step S009 of FIG. 17, it is checked whether the button identification information of the operation button 81 in which the coordinates of the display range 82 are obtained in Step S004 protrudes from the display area of the display unit 31. In FIG. 18, it is checked whether the operation button 81 is the operation button 81 in which the display mode of the button identification information is changed by the method according to the second embodiment.

Firstly, in Step S010 of FIG. 18, it is checked whether the group mode is valid (ON). In case that the group mode is invalid (OFF) (Step S010; No), the process proceeds to Step S015 of FIG. 19.

In case that the group mode is valid (ON) (Step S010; Yes), it is checked whether the left flag is ON (Step S011). In case that the left flag is OFF (Step S011; No), it is checked whether the operation button 81 having the value of i+1 and the operation button 81 arranged on the left side of the operation button 81 having the value of i+1 (the operation button having the value of i) belong to the same group (Step S012). In case that both of the operation buttons 81 belong to the same group (Step S012; Yes), the process proceeds to Step S015 of FIG. 19. In case that both of the operation buttons 81 do not belong to the same group (Step S012; No), the process proceeds to Step S014.

In case that the left flag is ON (Step S011; Yes), it is checked whether the operation button 81 having the value of i+1 and the operation button 81 arranged on the right side of the operation button 81 having the value of i+1 (the operation button having the value of i+2) belong to the same group (Step S013). In case that both of the operation buttons 81 belong to the same group (Step S013; Yes), the process proceeds to Step S015 of FIG. 19. In case that both of the operation buttons 81 do not belong to the same group (Step S013; No), the process proceeds to Step S014.

In Step S014, the display mode change flag is turned off, and the process proceeds to Step S015 of FIG. 19. In FIG. 19, it is checked whether the operation button 81 in which the coordinates of the display range 82 are obtained in Step S004 of FIG. 17 is the operation button 81 in which the display mode of the button identification information is changed by the method according to the third embodiment.

Firstly, in Step S015 of FIG. 19, it is checked whether the setting related mode is valid (ON). In case that the setting related mode is invalid (OFF) (Step S015; No), the process proceeds to Step S020.

In case that the setting related mode is valid (ON) (Step S015; Yes), it is checked whether the set setting item exists (Step S016). In case that the set setting item does not exist (Step S016; No), the process proceeds to Step S020.

In case that the set setting item exists (Step S016; Yes), the information of the operation button 81 related to the setting item is checked with reference to the job function table 90 (Step S017). Further, it is checked whether the operation button 81 having the value of i+1 is the operation button 81 related to the setting item (Step S018).

In case that the operation button 81 having the value of i+1 is the operation button 81 related to the set setting item (Step 3018; Yes), the process proceeds to Step S020. In case that the operation button 81 having the value of i+1 is the operation button 81 that is not related to the set setting item (Step S018; No), the display mode change flag is set to OFF (Step S019) and the process proceeds to Step S020.

In Step S020, it is checked whether the display mode change flag is ON. In case that the display mode change flag is ON (Step S020; Yes), the display mode of the button identification information of the operation button 81 having the value of i+l is changed so as to display the whole button identification information in the range displayed on the display unit 31 (Step S021), and the process proceeds to Step S022. In case that the display mode change flag is OFF (Step S020; No), the process proceeds to Step S022.

In Step S022, the value i is incremented by 1, and the process returns to Step S003 of FIG. 17 and is continued. In case that the specific condition (i<NMAX) is not satisfied at the time of returning to Step S003, the process is ended.

The process of FIGS. 17 to 19 is repeatedly performed during the execution of the scrolling by the scroll operation. Further, also when the scrolling is completed, the process of FIGS. 17 to 19 is performed.

As described above, the embodiments of the present invention are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In at least one of the embodiments, the image forming apparatus 10 is explained as an example of the operation display device. However, the operation display device is not limited to this. From the image forming apparatus 10, the CPU 11, the ROM 12, the RAM 13, the nonvolatile memory 14, the network communication unit 20 and the operation panel 30 may be extracted and configured as an operation display device. Further, the present invention may be adopted as a program or an operation display method for causing an information processing apparatus to function as the operation display device.

In at least one of the embodiments, the case in which the button identification information of the operation button 81 protrudes from the display area of the display unit 31 by the scroll display is explained as an example. The case in which the button identification information of the operation button 81 protrudes from the display area of the display unit 31 due to the cause other than the scroll display is also included in the present invention. For example, when the contents displayed on the operation panel 30 are also enlarged or reduced by the image forming apparatus 10, there is some possibility that a part of the operation button 81 protrudes from the display area of the display unit 31.

FIGS. 20A and 20C show an example of the display contents displayed on the display unit 31 are enlarged, and an example of the display contents displayed on the display unit 31 are reduced.

FIG. 20A shows an example of the display contents which are displayed in the normal size, FIG. 20B shows an example in which the display contents of FIG. 20A are enlarged, and FIG. 20C shows an example in case that the display contents of FIG. 20A are reduced.

In FIG. 20A, the whole of three operation buttons 81 which are the operation buttons 81A, 81B and 81C are displayed in the display area of the display unit 31. The button identification information (FUNC A, FUNC B and FUNC C) of each operation button 81 is all displayed in the first display mode.

In FIG. 20B, by enlarging the display contents of FIG. 20A, a part of each of the operation buttons 81A and 81C protrudes from the display area of the display unit 31. In FIG. 20B, in case that the button identification information of the FUNC A and the button identification information of the FUNC C is displayed in the first display mode, a part of the button identification information of the FUNC A and a part of the button identification information of the FUNC C protrudes from the display area of the display unit 31.

In FIG. 20C, by reducing the display contents of FIG. 20A, the operation buttons 81 which are the operation buttons 81Z and 81D (in which the button identification information of the FUNC Z and the button identification information of the FUNC D is described) are newly displayed. However, a part of the operation button 81Z and a part of the operation button 81D protrude from the display area of the display unit 31, and in case that the button identification information of the FTNC Z and the button identification information of the FUNC D is displayed in the first display mode, a part of the button identification information of the FUNC Z and a part of the button identification information of the FUNC D protrudes from the display area of the display unit 31.

Like FIGS. 20B and 20C, in case that the image forming apparatus 10 enlarges or reduces the display contents displayed on the display unit 31, when the button identification information is displayed in the first display mode, there is some possibility that a part of the button identification information protrudes from the display area of the display unit 31. In this case, the image forming apparatus 10 changes the display mode of the above button identification information to the display mode (changed display mode) which is different from the first display mode.

In at least one of the embodiments, the changed display mode is the display mode in which the whole button identification information is displayed in the display area of the display unit 31. Further, even if the whole button identification information is not displayed in the display area of the display unit 31, the following display mode may be used. In the above display mode, only one portion of the button identification information, from which a user can recognize the function indicated in the button identification information is displayed in the display area of the display unit 31.

In at least one of the embodiments, one group is formed by a plurality of adjacent operation buttons 81. However, may the group may be formed by including the operation button 81 that is not adjacent to another operation button 81 belonging to the same group.

One of the objects of the above embodiments and the like is to provide an operation display device which can prevent the visibility of the function name or the like of the operation button, from being deteriorated when a part of the identification information indicating the function of the operation button protrudes from the display area.

In at least one of the above embodiments and the like, the operation buttons are displayed in the display area of the display unit. Then, in case that the identification information indicating the function assigned to each operation button is arranged in the operation button in the first display mode, when the operation button is displayed in a position in which whole of the identification information is displayed in the display area, the identification information is displayed in the operation button in the first display mode. On the other hand, in case that the identification information is arranged in the operation button in the first display mode, when the operation button is displayed in a position in which a part of the identification information protrudes from the display area, the display mode of the identification information is changed to a display mode which is different from the first display mode and the identification information is displayed in the operation button.

For example, in case that the scroll display is performed, or in case that display contents displayed on the display unit are enlarged or reduced, there is some possibility that a part of the text which indicates the function of the operation button and which is arranged in the operation button in the first display mode protrudes from the display area. In this case, the display mode of the text is changed, for example, so as to improve the visibility of the text.

In at least one of the above embodiments and the like, in case that the identification information of the function of the operation button protrudes from the display area of the display unit in the first display mode, the display mode of the identification information is changed so as to display the whole identification information in the display area.

In at least one of the above embodiments and the like, at least one of the reduction of the identification information, the change in the array of the identification information (vertical/horizontal writing or the like), the change in the arrangement position of the identification information, and the omission indication of the identification information, is executed. Thereby, the display mode is changed into a display mode different from the first display mode and the identification information showing the function assigned to the operation button is displayed.

In at least one of the above embodiments and the like, in case that one operation button belonging to one group is displayed in the position in which a part of the identification information protrudes from the display area and in case that any other operation buttons belonging to the one group to which the one operation button belongs are not displayed in the display area of the display unit, the identification information of the one operation button is displayed in the first display mode. In case that one operation button belonging to one group is displayed in the position in which a part of the identification information protrudes from the display area and in case that at least one of the other operation buttons belonging to the one group to which the one operation button belongs is displayed in the display area of the display unit, the display mode of the identification information is changed to the display mode which is different from the first display mode and the identification information of the one operation button is displayed. That is, in case that no operation button belonging to the one group to which the one operation button belongs is displayed in the display area, the identification information of the one operation button, which is displayed in the position in which a part of the identification information protrudes from the display area is displayed in the first display mode. In case that at least one of the other operation buttons belonging to the one group to which the one operation button belongs is displayed in the display area, the identification information of the one operation button, which is displayed in the position in which a part of the identification information protrudes from the display area is displayed in the display mode which is different from the first display mode. Therefore, the user can recognize whether the operation button displayed in the position in which a part of the identification information protrudes from the display area, belongs to the one group to which another operation button displayed in the display area belongs.

In at least one of the above embodiments and the like, in case that the operation button related to the set setting item is displayed in the position in which a part of the identification information protrudes from the display area, the identification information of the related operation button is displayed by changing the display mode of the identification information to the display mode which is different from the first display mode. In case that the operation button which is not related to the set setting item is displayed in the position in which the part of the identification information protrudes from the display area, the identification information of the operation button which is not related to the set setting item is displayed in the first display mode. As a result, the user can recognize whether the operation button is related to the set setting item, according to whether the display mode of the identification information of the operation button displayed in the position in which the part of the identification information protrudes from the display area is the first display mode.

In at least one of the above embodiments and the like, for example, in case that the scroll display is performed, the display mode of the identification information of the operation button is changed during the scrolling.

According to the operation display device, it is possible to prevent the visibility of the function name or the like of the operation button, from being deteriorated when a part of the identification information indicating the function of the operation button protrudes from the display area.

The present U.S. patent application claims the priority of Japanese Patent Application No. 2015-001872, filed on Jan. 7, 2015, according to the Paris Convention, and the entirety of which is incorporated herein by reference for correction of incorrect translation.

What is claimed is:

1. An operation display device, comprising:
a display; and
a processor which is configured to display operation buttons in a display area of the display, and to display identification information indicating a function assigned to the respective operation buttons arranged within the corresponding operation button;
wherein:
the processor is configured to perform a scroll operation in which the plurality of operation buttons are scrolled across the display area of the display;
during the scroll operation, the processor is configured to selectively display the identification information of each of the operation buttons in one of a first format, a second format, and a third format, wherein the first format, the second format, and the third format are different from each other;
during the scroll operation, the processor determines, for each displayed operation button, whether the operation button is displayed at (i) a first position at which an entirety of the identification information thereof is displayed within the display area if the identification information is displayed in the first format, (ii) a second position at which a part of the identification information of the operation button protrudes from the display area if the identification information is displayed in the first format, and (iii) a third position at which a larger part of the identification information protrudes from the display area if the identification formation is displayed in the first format as compared to when the operation button is displayed at the second position;
for each displayed operation button, (i) the processor displays the identification information in the first format if the processor determines that the operation button is displayed at the first position, (ii) the processor displays the identification information in the second format if the processor determines that the operation button is displayed at the second position, and (iii) the processor displays the identification information in the third format if the processor determines that the operation button is displayed at the third position;
in displaying the identification information in the second format or the third format, the processor reformats the identification information such that an entirety of the identification information is displayed within the display area of the display if the operation button is displayed at a corresponding one of the second position and the third position; and
during the scroll operation, the processor is configured to dynamically reformat the identification information of each displayed operation button between the first format, the second format, and the third format in accordance with a determination of whether the operation button is displayed at the first position, the second position, or the third position.

2. The operation display device of claim 1, wherein, in displaying the identification information in the second format or the third format, the processor reformats the identification information by executing at least one of a reduction of the identification information, a change in an array of the identification information, and a change in an arrangement position of the identification information.

3. The operation display device of claim 1,
wherein a plurality of the operation buttons are grouped, and
wherein the processor is further configured such that:
in a case in which one operation button belonging to one group is displayed in the second position or the third position and any other operation buttons belonging to the one group to which the one operation button belongs are not displayed in the display area, the processor displays the identification information of the one operation button in the first format, and
in a case in which the one operation button belonging to the one group is displayed in the second position or the third position and at least one of the other operation buttons belonging to the one group to which the one operation button belongs is displayed in the display area, the processor displays the identification information of the one operation button displayed in the second position or the third position in the corresponding one of the second format and the third format.

4. The operation display device of claim 1, wherein the processor is further configured such that:
in a case in which an operation button related to a set setting item is displayed in the second position or the third position, the processor displays the identification information of the operation button related to the set setting item in the corresponding one of the second format and the third format, and in a case in which the operation button which is not related to the set setting item is displayed in the second position or the third position, the processor displays the identification information of the operation button which is not related to the set setting item, in the first format.

* * * * *